(12) United States Patent
Chalam et al.

(10) Patent No.: US 11,599,839 B2
(45) Date of Patent: Mar. 7, 2023

(54) SYSTEMS AND METHODS FOR LIMITING AUTONOMOUS VEHICLE REQUESTS

(71) Applicant: Uber Technologies, Inc., San Francisco, CA (US)

(72) Inventors: Janita Chalam, San Francisco, CA (US); Andrii Iasynetskyi, Millbrae, CA (US)

(73) Assignee: Uber Technologies, Inc, San Francisco, CA (US)

( * ) Notice: Subject to any disclaimer, the term of this patent is extended or adjusted under 35 U.S.C. 154(b) by 12 days.

(21) Appl. No.: 17/014,452

(22) Filed: Sep. 8, 2020

(65) Prior Publication Data
US 2022/0027820 A1    Jan. 27, 2022

Related U.S. Application Data

(60) Provisional application No. 63/055,921, filed on Jul. 24, 2020.

(51) Int. Cl.
| | |
|---|---|
| *G06Q 10/02* | (2012.01) |
| *G06Q 50/30* | (2012.01) |
| *G06Q 10/06* | (2012.01) |
| *G06Q 10/0631* | (2023.01) |

(52) U.S. Cl.
CPC ....... *G06Q 10/06315* (2013.01); *G06Q 10/02* (2013.01); *G06Q 10/06312* (2013.01); *G06Q 50/30* (2013.01)

(58) Field of Classification Search
CPC .................................................. G06Q 50/30
See application file for complete search history.

(56) References Cited

U.S. PATENT DOCUMENTS

| | | | |
|---|---|---|---|
| 9,473,413 B1* | 10/2016 | Cao ......................... | H04L 47/24 |
| 2018/0139140 A1* | 5/2018 | Gholmieh ............. | H04W 28/02 |
| 2018/0211541 A1* | 7/2018 | Rakah .................... | G08G 1/148 |

(Continued)

OTHER PUBLICATIONS

Ally, "Rate Limiting", https://www.ally.com/api/invest/documentation/rate-limiting/, retrieved on Sep. 8, 2020, 5 pages.
(Continued)

*Primary Examiner* — Hafiz A Kassim
*Assistant Examiner* — Matheus Ribeiro Stivaletti
(74) *Attorney, Agent, or Firm* — Schwegman Lundberg & Woessner, P.A.

(57) ABSTRACT

Systems and methods for limiting autonomous vehicle requests are provided. The method includes obtaining data indicative of a request for access to a software service for facilitating one or more transportation services. The method can include granting access to the software service based on a rate limit associated with the request and a request history. The rate limit can be associated with any combination of a vehicle provider determined based on the request, the software service for which access is requested, or current data. The rate limit can define a threshold number of requests over a period of time. The method can include determining the routing action for the request based on the rate limit and a request history associated the vehicle provider, the software service, or current data. The routing action can include granting access if the request history is less than the threshold number of requests.

20 Claims, 9 Drawing Sheets

(56) References Cited

U.S. PATENT DOCUMENTS

2019/0196503 A1* 6/2019 Abari .................... G06Q 10/00
2019/0285425 A1* 9/2019 Ludwick ................ G07C 5/008

OTHER PUBLICATIONS

Wikipedia, "Leaky bucket", https://en.wikipedia.org/wiki/Leaky_bucket, retrieved on Sep. 8, 2020, 15 pages.

* cited by examiner the request. The operations can include determining a routing action for the request based, at least in part, on a request history associated with the at least one software service and the rate limit corresponding to the request. And, the operations can include initiating the routing action.

SYSTEMS AND METHODS FOR LIMITING AUTONOMOUS VEHICLE REQUESTS

RELATED APPLICATION

The present application is based on and claims benefit of U.S. Provisional Patent Application No. 63/055,921 having a filing date of Jul. 24, 2020, which is incorporated by reference herein.

FIELD

The present disclosure relates generally to vehicle services and, more particularly, to limiting autonomous vehicle requests to back-end services for facilitating vehicle services.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given such knowledge, an autonomous vehicle can navigate through the environment.

SUMMARY

Aspects and advantages of implementations of the present disclosure will be set forth in part in the following description, or may be learned from the description, or may be learned through practice of the implementations.

An example aspect of the present disclosure is directed to a computer-implemented method. The method can include obtaining, by a computing system comprising one or more computing devices, data indicative of a request for access to a software service for facilitating one or more transportation services. The method can include determining, by the computing system, a vehicle provider based at least in part on the data indicative of the request for access to the software service. The method can include determining, by the computing system, a rate limit corresponding to the request based, at least in part, on at least one of the vehicle provider or the software service. The rate limit can define a threshold number of requests over a period of time. The method can include determining, by the computing system, a routing action for the request based, at least in part, on the rate limit corresponding to the request and a request history associated with the vehicle provider or the software service. And, the method can include initiating, by the computing system, the routing action.

Another example aspect of the present disclosure is directed to a computing system. The computing system can include a plurality of software services for facilitating one or more transportation services, one or more processors, and one or more tangible, non-transitory, computer readable media that collectively store instructions that when executed by the one or more processors cause the computing system to perform operations. The operations can include obtaining data indicative of a request from a vehicle provider for access to at least one software service of the plurality of software services. The operations can include determining a rate limit corresponding to the request based, at least in part, on the vehicle provider. The rate limit can define a threshold number of requests over a period of time. The operations can include determining a routing action for the request based, at least in part, on a request history associated with the at least one software service and the rate limit corresponding to the request. And, the operations can include initiating the routing action.

Yet another example aspect of the present disclosure is directed to one or more tangible, non-transitory, computer-readable media storing computer-readable instructions that when executed by one or more processors cause the one or more processors to perform operations. The operations can include obtaining data indicative of a request for access to a software service for facilitating one or more transportation services. The operations can include determining a vehicle provider associated with the request based, at least in part, on the request. The operations can include determining a rate limit corresponding to the request based, at least in part, on the vehicle provider and the software service. The rate limit can define a threshold number of requests over a period of time. The rate limit can be previously determined based, at least in part, on one or more service-provider features associated with the vehicle provider and the software service. The operations can include determining a routing action for the request based, at least in part, on a request history associated with the software service and the rate limit corresponding to the request. And, the operations can include initiating the routing action.

Other example aspects of the present disclosure are directed to other systems, methods, vehicles, apparatuses, tangible non-transitory computer-readable media, and the like for limiting autonomous vehicle requests.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
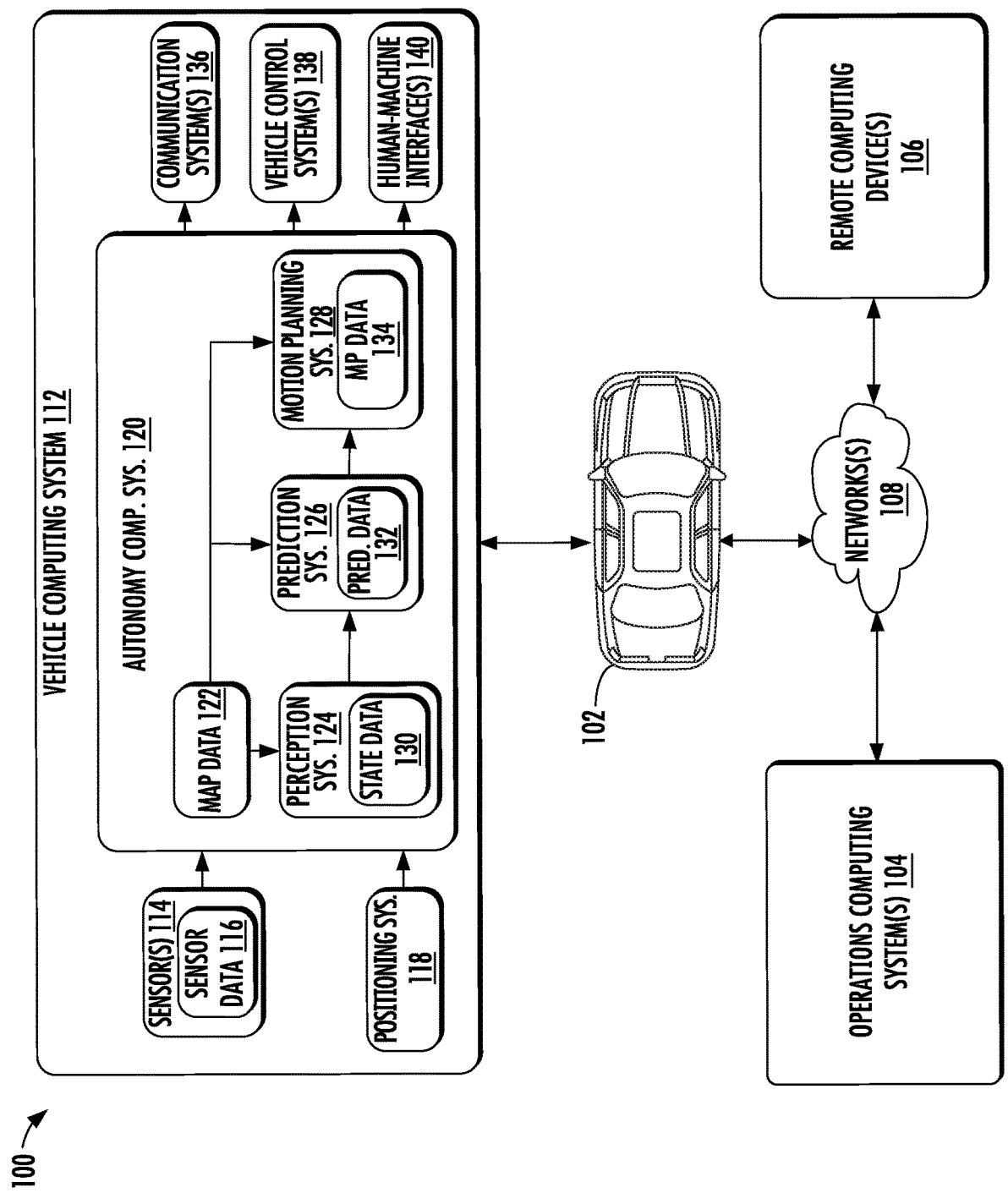
FIG. 1 depicts a block diagram of an example system for controlling the navigation of an autonomous vehicle according to example embodiments of the present disclosure.

Example aspects of the present disclosure are directed to improved rate limiters for servicing requests associated with autonomous vehicles. For instance, the present disclosure describes dynamic rate limiters for limiting requests for access to one or more backend services for facilitating a transportation service. In particular, a computing system can obtain a request for access to a software service (e.g., from a service provider computing system associated with a transportation service, a vehicle provider associated with one or more vehicles configured to provide the transportation service, an autonomous vehicle, etc.) and determine a vehicle provider based on the request. This can include a vehicle provider that sent the request to access the backend service or a vehicle provider likely to perform a user requested transportation service. A vehicle provider, for instance, can include vehicle vendor(s), operator(s), manager(s), etc. that own, operate, manage, etc. one or more autonomous vehicles configured to perform a transportation service. The computing system can determine a rate limit corresponding to the request based on the software service, the vehicle provider, and/or current data (e.g., time of day, environmental conditions, etc.). The rate limit can define a threshold number of requests over a period of time. The computing system can determine a routing action (e.g., forward request to the software service, ignore/discard request the request, queue the request, etc.) for the request based on the rate limit and a request history associated with the software service and/or the vehicle provider. For instance, the computing system can increment the request history with the request. The computing system can forward the request to the software service if the incremented request history identifies a number of requests that do not achieve/exceed the threshold number of requests over the period of time defined by the rate limit and ignore, discard, or queue the request if the incremented request history identifies a number of requests that achieve/exceed the threshold number of requests over the period of time defined by the rate limit.

The rate limit can be determined for a respective request from a plurality of bucketized rate limits dynamically determined for one or more software service(s) and/or vehicle provider(s) associated with a service entity. For instance, the service entity can include a backend system (e.g., an operations computing system, one or more backend servers, etc.) that provides software service(s) for facilitating (e.g., determining availability for, matching, scheduling, routing, updating, etc.) a transportation service. The vehicle provider(s), one or more vehicles thereof, or a service provider computing system can access the software service(s) to help provide a transportation service. Each of the rate limits can be determined based on attributes of a software service and/or a vehicle provider such that rate limits are uniquely tailored to aspects of a respective service or provider. For instance, a rate limit can be determined based on a usage rate (e.g., historical number of access requests) between a vehicle provider and a software service such that a rate limit can include a higher threshold number of requests over a period of time for the software services or vehicle providers associated with a higher usage rate. In this manner, the computing system can utilize dynamic rate limits to determine an appropriate routing action for a request based on the circumstances in which the request is received. In this way, the technology of the present disclosure can increase computer security (e.g., by preventing malicious attacks from overloading a backend service provider, software service, or vehicle provider), without sacrificing computing resources (e.g., energy, processing, memory, etc.) by servicing redundant requests or unduly limiting the number of requests serviced.

The following describes the technology of this disclosure within the context of autonomous vehicles for example purposes only. As described herein, the technology described herein is not limited to autonomous vehicles and can be implemented within other robotic and computing systems, such as those utilized by ridesharing and/or delivery services.

An autonomous vehicle (e.g., ground-based vehicle, aerial vehicles, bikes, scooters, and other light electric vehicles, etc.) can include various systems and devices configured to control the operation of the vehicle. For example, an autonomous vehicle can include an onboard vehicle computing system (e.g., located on or within the autonomous vehicle) that is configured to operate the autonomous vehicle. Generally, the vehicle computing system can obtain sensor data from a sensor system onboard the vehicle, attempt to comprehend the vehicle's surrounding environment by performing various processing techniques on the sensor data, and generate an appropriate motion plan through the vehicle's surrounding environment. Additionally, the vehicle computing system can communicate with a remote computing system such as, for example, an operations computing system and/or a one or more remote devices via a communication system onboard the vehicle. The operations computing system can be associated with a service entity that provides one or more vehicle services.

The operations computing system of a service entity can include various sub-systems/back-end software services that are configured to perform various functions. For example, the operations computing system can include one or more backend servers configured to host a plurality of backend software services for facilitating one or more transportation services. The plurality of backend software services can include a plurality of different services such as, for example, one or more trip assignment service(s), matching/deployment software service, routing service(s), supply positioning service(s), payment service(s), remote operator service(s), and/or any other software service that can contribute to the provisioning of a transportation service. As examples, the matching/deployment software service(s) can be configured to receive data indicative of a user service request (e.g., from a service provider computing system, etc.) for a vehicle service, identify a plurality of candidate vehicles available to perform at least a portion of the vehicle route, etc. The routing software service(s) can be configured to determine the vehicle route based on the user service request. And, the trip assignment service(s) can be configured to assign the user service request to a candidate vehicle.

For example, in some implementations, a service provider computing system can receive a user service request (e.g., from a user device, another computing system, etc.) for a transportation service. The service provider computing system can generate a request for access to the one or more backend services of the operations computing system (e.g., the matching/deployment software service(s)) to check the availability of an autonomous vehicle to perform the transportation service, match an autonomous vehicle with the transportation service, schedule an autonomous vehicle for the transportation service, etc. The service provider computing system can provide data indicative of the request to access the backend service(s) of the operations computing system to facilitate such functions. This can include data indicative of the user service request (e.g., associated locations, request attributes, etc.), as further described herein. In some implementations, the request for access to the backend service(s) can indicate certain vehicle provider(s). In some implementations, the backend service(s) can determine that the associated user service request would likely be matched to the vehicles of a particular vehicle provider (e.g., based on a certain vehicle make/model that can be found within that particular vehicle provider's fleet, etc.). A vehicle provider can be "matched" (e.g., determined based on the request) such that an autonomous vehicle within that vehicle provider's fleet is assigned to (or requested to) provide the transportation service specified in the user service request.

The operations computing system can communicate, via another software service, data indicative of the user service request to the candidate vehicle (e.g., directly and/or indirectly to the vehicles, etc.) or a vehicle provider associated with the candidate vehicle (e.g., service entity service provider, third part service provider, etc.). The candidate vehicle and/or the vehicle provider can perform the requested transportation service by utilizing (e.g., via one or more requests for access to, etc.) one or more of the backend services provided by the operations computing system. In this manner, the operations computing system can be configured to facilitate a transportation service utilizing multiple service providers via a plurality of backend software services.

More particularly, the operations computing system (e.g., via a matching/deployment software service) can receive data indicative of a user service request for a vehicle service. The vehicle service can be associated with a user. As discussed herein, the operations computing system (e.g., the matching/deployment software service(s)) can receive the data indicative of the service request for a vehicle service from the service provider computing system. The service provider computing system can obtain the user service request from a user of a service entity. In addition, or alternatively, the operations computing system can receive the user service request directly from the user (e.g., via a user device) and/or a third party service provider (e.g., via a third-party computing system) associated with the service entity. The user service request can include data indicative of a start location and an end location. For example, the service request can be associated with a transportation service for a user from the start location (e.g., a requested origin, etc.) to the end location (e.g., a requested destination, etc.). As another example, the user service request can be associated with a transportation service for one or more items (e.g., items/products for personal delivery, bulk items for business, freight transportation, baggage, other payloads, etc.) from the start location to the end location.

The operations computing system (e.g., via a routing software service(s)) can determine a vehicle route from the start location to the end location. For instance, the operations computing system (e.g., routing software service(s)) can access map data indicative of the start location and the end location. The operations computing system (e.g., routing software service(s)) can determine the vehicle route based at least in part on the map data. For example, the vehicle route can include one or more directions based at least in part on the map data. The directions, for example, can include one or more vehicle maneuvers (e.g., driving maneuvers, etc.) and/or geographic areas necessary to transport the user and/or items from the start location to the end location. In some implementations, the directions can include one or more command instructions for controlling a vehicle (e.g., an autonomous vehicle) to travel along the vehicle route.

For example, the vehicles can include human-driven and/or autonomous vehicles of a vehicle provider. The vehicle providers can include the service entity (supplying "first party autonomous vehicles" or "service entity autonomous vehicles") and/or one or more third-party vehicle providers (supplying "third party autonomous vehicles"). A third-party vehicle provider can be, for example, a third party vehicle vendor, operator, manager, etc. that owns, operates, manages, etc. a fleet of third party autonomous vehicles. In this regard, each of the one or more vehicle providers can be associated with one or more fleets of vehicles. The vehicle providers can make their fleets (or a portion of their fleets) of vehicles available (e.g., through the service entity, etc.) such that the vehicles are available for performing vehicle services (e.g., to address a user service request). Thus, each respective vehicle in the plurality of vehicles can be associated with at least one of the one or more fleets of vehicles associated with the one or more vehicle providers.

The operations computing system associated with the service entity can provide a plurality of back-end software services for facilitating the transportation service after a route is determined and a candidate vehicle is assigned for the transportation service. The plurality of backend software services, for example, can be accessible to each of the vehicles, vehicle providers, and/or a service provider computing system before, during, and/or after the performance of a transportation service. By way of example, the backend software service accessible to the autonomous vehicles during the performance of a transportation service can include supply positioning service(s) to route the vehicle to a location (e.g., an expected high density area, etc.) after/before a transportation service, payment service(s) (e.g., to process payments for the transportation service), remote assistance/operator service(s) (e.g., to control the vehicle in one or more potentially hazardous circumstances, etc.), and/or any other software service that can contribute to the performance of the transportation service. As another example, the backend software service accessible to a service provider computing system before the performance of the transportation service can include a matching/deployment backend service, and/or any other software service that can contribute to the scheduling/assignment of the transportation service. This back-end service can also, or alternatively, provide a response to a service provider computing system to indicate that an autonomous vehicle would be available for a user. This can allow the service provider computing system to offer an autonomous vehicle as option for the transportation service for the user (e.g., via a user interface of an application running on a user device). The backend software services can be provided and maintained at one or more backend servers (e.g., of the operations computing system) configured to process a plurality of requests for access (e.g., from vehicles, vehicle providers, service provider computing systems, etc.) to one or more of the software services.

If unchecked, a number of requests (e.g., from vehicle providers, the service provider computing system, malicious parties, etc.) can overload backend services and/or the server(s) hosting the services such that the performance of the service(s) and/or the servers(s) can be impaired. The operations computing system can utilize dynamic bucketized rate limiters to prevent the overload of such services and/or servers. The bucketized rate limits, can protect the service(s) and/or server(s) from attacks designed to overload the service(s)/server(s) by limiting the number of acceptable requests to a server and/or service over a period of time (e.g., one second, min, etc.). As described herein, the operations computing system can determine one or more dynamic bucketized rate limits for each software service provided by a service entity and/or each vehicle provider associated with the service entity based on attributes of the software service(s), the vehicle provider(s) requesting access to the software service(s), and/or current data (e.g., time, environmental conditions that may affect the integrity of the service (e.g., rain can cause bandwidth problems thus requiring a lower rate limit), etc.).

For example, the operations computing system can include an initial bucketing mechanism for rate limiting requests that can include tunable and/or expandable rate limiting buckets. The buckets can expand as the number and usage rate of backend software services provided by the service entity expand. Such rate limiters can be lightweight, easy to maintain, and enable per-partner (e.g., vehicle provider) rate limits. In this manner, the bucketing mechanisms for rate limiting incoming traffic from vehicle providers, service provider computing systems, etc. can prevent requests to one service and/or from/to one vehicle provider from starving computing resources available to other services or vehicle providers, as well as the vehicles associated therewith.

More particularly, the operations computing system can include a communication gateway configured to filter a plurality of requests before the requests are routed to a respective backend software service and/or vehicle provider. The communication gateway, for example, can act as a gate between one or more servers of the operations computing system that host the plurality of backend software services and one or more computing devices (e.g., user devices, vehicle devices, vehicle provider devices, etc.) associated with the plurality of vehicle providers. For instance, the communication gateway can be located at the edge of the operations computing system (and/or the one or more servers hosting the plurality of backend software services) such that the plurality of requests pass through the communication gateway before reaching a respective backend software service.

The communication gateway can include an authentication service and/or a rate limiting service. The authentication service can be configured to authenticate a request based on one or more aspects of the request (e.g., sender, cryptographic keys, etc.). For instance, the authentication service can receive the request and identify a client certificate associated with the request (e.g., the client certificate can be included in the header of the request, etc.). The authentication service can parse the client certificate to determine the vehicle provider associated with the request. By way of example, the client certificate can include a service provider identifier corresponding to at least one vehicle provider associated with the operations computing system (e.g., a vehicle provider of the service entity). The service provider identifier can include, for example, a cryptographic key (e.g., symmetric key, asymmetric key, etc.) issued to a respective vehicle provider by a licensing service of the service entity. The authentication service can identify the transportation service provider associated with the request based on the service provider identifier. The authentication service can authenticate the request based, at least in part, on the client certificate and provide the request and an identifier for the vehicle provider to the rate limiting service.

In addition, or alternatively, the request can include a request from a service provider computing system requesting access to the one or more backend services to determine the availability of, to match, and/or to schedule a transportation service with an autonomous vehicle. A vehicle provider can be determined based, at least in part, the request. For instance, the request can include a request for a respective vehicle provider to complete the user service request. By way of example, the request can include one or more request attributes. The one or more request attributes can be indicative of a sender of the request (e.g., the service provider identifier), a requested vehicle provider for providing the one or more transportation services, selected parameters by the user (e.g., vehicle make, model, size, special accommodations (e.g., wheel chair accessible, child seat inclusion, etc.), and/or other service parameters. In some implementations, to match and/or schedule an autonomous vehicle, a communication can be sent to the vehicle provider (e.g., a computing system associated therewith) to determine if the vehicle provider would like to and/or will provide transportation service. The matching/scheduling of an autonomous vehicle from that vehicle provider can be made in response to a confirmation that the vehicle provider is willing to/will undertake the requested transportation service.

The rate limiting service can receive the request and the information (e.g., the one or more request attributes, service provider identifier, request vehicle provider, etc.) indicative of the vehicle provider associated with the request and determine a routing action for the request. By way of example, the rate limiting service can maintain a request history associated with each vehicle provider and/or software service. The request history can identify a number of requests received from each respective service provider over a period of time (e.g., number of requests received in the last second, 10 seconds, 10 minutes, etc.). The rate limiting service can maintain a separate request history for each service provider of the plurality of service providers. In addition, or alternatively, the rate limiting service can maintain a separate request history for each software service provided by the operations computing system. By way of example, the rate limiting service can use a custom key associated with the vehicle provider and/or the software service to assign the request to a bucket. Each bucket can include a request history and a corresponding rate limit. The rate limiting service can maintain a request count for each bucket and compare the request count over a period of time (e.g., as augmented by the request) with a respective rate limit to determine a routing action for the request. In some implementations, the rate limit can be based at least in part on a number of available vehicles of the determined vehicle provider (to avoid overloading that vehicle provider).

In this respect, the operations computing system (e.g., the rate limiting service) can determine a rate limit (e.g., the assigned bucket) for the request for access to a software service based, at least in part, on the vehicle provider associated with the request, the backend software service, and/or any other information associated with the performance and/or the demands of the system. By way of example, the rate limit associated with the request can include one of a plurality of rate limits. The plurality of rate limits can include one or more backend software service, vehicle provider, vehicle fleet (e.g., of a service provider, etc.), and/or vehicle specific rate limits.

In some implementations, rate limits can include a portion of a universal rate limit. For example, the universal rate limit can include a global rate limitation defining a maximum number of acceptable requests by the one or more servers hosting a plurality of software services. The global rate limitation can be divided between each of the plurality of rate limits. In some implementations, the operations computing system can prioritize network traffic based on the overall resource consumption of the system by allocating a larger rate limit (e.g., a larger bucket) to one or more software services, vehicle providers, vehicle fleets, etc.

As an example, each of the plurality of software services offered by the service entity can be associated with one or more rate limits (e.g., buckets) of a plurality of previously determined and continuously updated rate limits. For example, a respective software service can be associated with a different rate limit (e.g., bucket) for each of the plurality of vehicle providers, for each of a plurality of different time intervals (e.g., accept a higher threshold of requests during rush hour, etc.), for each of a plurality of different weather attributes, etc. As another example, each of the plurality of vehicle providers can be associated with one or more of a plurality of previously determined and continuously updated rate limits (e.g., buckets). For example, a vehicle provider can be associated with a different rate limit for each of the plurality of different backend software services, for each a plurality of different time intervals (e.g., accept a higher threshold of requests during rush hour, etc.), for each of a plurality of different weather attributes, etc.

Each of the plurality of rate limits can be previously determined based, at least in part, on one or more environmental attributes, one or more service attributes, one or more fleet attributes, one or more provider attributes, and/or one or more service-provider attributes. The environmental attribute(s) can include weather conditions, timing data, location data, etc. For example, rate limits can be determined such that a threshold number of acceptable requests over time can be lower and/or higher for a request received during one or more weather conditions (e.g., rain, ice, etc.), at one or more times (e.g., during rush hours, etc.), and/or from one or more locations (e.g., highly trafficked areas, etc.) that can affect the performance of one or more of the software services and/or indicate of a larger number of expected requests.

The service attribute(s) can include at least one of a software version (e.g., indicative of the latest update to a respective software service) of the at least one respective software service, a service usage pattern indicative of a pattern of requests (e.g., a historical number of requests over time and/or during one or more periods of time, etc.) for access to the at least one respective service, and/or a safety threshold of the at least one respective software service. The safety threshold can be indicative of the impact of a respective software service to the safety of the vehicle and/or one or more passengers of the vehicle.

As an example, a remote operator service and/or an emergency stop service can function to increase passenger safety, whereas a routing service can have a limited impact on the safety of passengers. In such a case, the remote operator service and/or emergency stop service can be associated with a higher safety threshold than the routing service. In some implementations, the operations computing system can determine rate limits with a higher threshold number of acceptable requests over time (e.g., larger buckets, etc.) for software service(s) associated with higher safety thresholds than for software service(s) associated with lower safety thresholds. This can lower the number of acceptable requests (e.g., the portion of the universal rate limit) for other backend services offered by the service entity to increase the overall safety of the service entity platform.

In some implementations, a priority level can be determined for each of the plurality of software services. The priority level can be used to prioritize a software service and/or the task performed by the software service. By way of example, the priority level for each software service can include the safety threshold. In addition, or alternatively, the priority level can be determined based on the usage rate of a software service relative to another software service (e.g., a higher priority can be assigned to a highly used software service as opposed to an under used software service, etc.). In some implementations, the rate limits for each of the plurality of software services can be determined based on the priority level of each of the plurality of software services relative to one another. For example, the universal rate limit can be apportioned to each of the software services based, at least in part, on the priority levels associated with each of the software services.

The provider attribute(s) can be indicative of a provider usage pattern indicative of a pattern of requests for access to the plurality of services or an integrity threshold associated with a respective vehicle provider. The integrity threshold can be associated with the trustworthiness of the provider. By way of example, the integrity threshold of a respective vehicle provider can be based, at least in part, on a service provider history (e.g., how long the service provider has been associated with the service entity, etc.) associated with the vehicle provider. By way of example, vehicle providers that have been associated with the service entity (e.g., performing transportation services for the service entity) for a longer period of time can be associated with a higher integrity threshold relative to newer vehicle providers. In some implementations, rate limit(s) can be determined such that vehicle providers associated with a higher integrity threshold are assigned a rate limit (e.g., bucket) with a higher threshold of acceptable requests over time relative to vehicle providers associated with a lower integrity threshold.

In addition, or alternatively, the provider attributes can include one or more fleet attributes. The fleet attribute(s) can include information associated with one or more vehicles provided by a respective service provider. The fleet attributes, for example, can be indicative of an age, operational capabilities, and/or a size of a fleet of vehicles associated with the respective vehicle provider. By way of example, each vehicle of the plurality of vehicles used by the service entity to perform one or more transportation services can be associated with a particular fleet of vehicles based on one or more shared attributes such as, for example, a manufacturer of the vehicle (e.g., make, model, etc.), a type of the vehicle (non-autonomous, autonomous, etc.), the vehicle provider, and/or other factors sufficient to separate a plurality of vehicles.

In some implementations, each fleet of vehicles can be associated with one or more operational capabilities. For example, each of the one or more fleets of vehicles can be associated with a set of operational capabilities. In some implementations, the operational capabilities of each vehicle in a respective fleet of vehicles can correspond to the set of operational capabilities associated with the respective fleet of vehicles. The operational capabilities of a vehicle and/or a fleet can indicate the capabilities (e.g., autonomy capabilities, etc.) the vehicle/fleet is able to perform, the capabilities the vehicle/fleet are unable to perform, areas in which the vehicle/fleet are able and/or permitted to operate, areas in which the vehicle/fleet are unable and/or restricted from operating, etc.

The operations computing system can determine rate limit(s) for a vehicle provider based on the one or more fleet attributes associated with one or more fleets of the vehicle provider. By way of example, the operations computing system can determine one or more rate limit(s) with a higher threshold of acceptable requests for a service provider associated with a larger fleet of vehicles relative to service providers associated with a smaller fleet of vehicles. As another example, the operations computing system can determine one or more rate limit(s) with a higher/lower threshold of acceptable requests over time for a service provider associated with more vehicles requiring more manual intervention (e.g., human-driven vehicles, outdated vehicles, etc.) relative to service providers associated with more autonomy-capable vehicles (e.g., fully autonomous vehicles, newer vehicle models, etc.) as indicated by the operational capabilities of the vehicles.

The service-provider attributes can include and/or be indicative of one or more usage patterns indicative of one or more previous requests for access to a respective software service from a respective vehicle provider during one or more periods of time. For instance, each of the one or more service attributes, one or more provider attributes, and/or one or more service-provider attributes can include one or more usage patterns indicative of one or more previous requests for access to one or more of the plurality of software services. The one or more usage patterns can be indicative of a number of previous requests for access to one or more of the plurality of software services during one or more periods of time. For example, the service attributes can include one or more usage patterns indicative of a previous number of requests received for access to a respective software service over one or more periods of time. The provider attributes can include one or more usage patterns indicative of a previous number of requests received for access to the plurality of software services from a respective vehicle provider. And, the service-provider attributes can include one or more usage patterns indicative of a previous number of requests received for access to a respective software service from a respective vehicle provider.

In some implementations, the service-provider attributes can be indicative of an expected number of requests from a fleet of vehicles to one or more respective software services based on the operational capabilities of the vehicles in the fleet(s) of a respective vehicle provider and/or the type of services offered by the one or more respective software service(s). By way of example, an earlier version of an autonomous vehicle may make more calls to a remote operator service than advanced versions. In such a case, a threshold number of acceptable requests can be set for requests between a vehicle provider and a respective software service based on the expected number of requests.

As described herein, the rate limit(s) can be utilized to determine a routing action for a request. For example, the operations computing system can obtain a request for access to a software service for facilitating one or more transportation services. For instance, the operations computing system can provide a plurality of software services for facilitating one or more transportation services. The plurality of different software services can include one or more of a trip assignment service, a routing service, a supply positioning service, a payment service, a remote operator service and/or any other software service described herein or otherwise associated with facilitating one or more transportation services via one or more vehicles (e.g., manual, autonomous, etc.). The software service can include one of the plurality of software services provided by the operations computing system. The operations computing system can obtain the request from a vehicle provider and/or one or more intermediate services associated with the vehicle provider.

The operations computing system can determine a vehicle provider associated with the request. For example, as described above, an authentication service can receive the request and identify the vehicle provider based on one or more request identifiers. The identifier(s) can include, for example, a client certificate with one or more custom keys (e.g., a service provider identifier, etc.). In addition, or alternatively, the identifier(s) can include an internet protocol address. The operations computing system can determine the transportations service provider associated with the request based, at least in part, on the identifier(s). For example, a respective vehicle provider can be associated with one or more corresponding identifier(s) and/or internet protocols.

In some implementations, the operations computing system can obtain current data. The current data can include a current time (e.g., daily time, date, etc.), a geographic location associated with the request (e.g., a location of the vehicle for which the request is generated, etc.), current environmental conditions (e.g., weather conditions at the geographic location, etc.), and/or any other current information associated with a transportation service. By way of example, the current data can be indicative of the time during which the request is received (e.g., a time stamp, etc.), one or more current environmental conditions (e.g., rain, sleet, snow, etc.), and/or a geographic location where the request originated.

The operations computing system can determine a rate limit corresponding to the request. The rate limit can define a threshold number of requests over a period of time. For example, the threshold number of requests can be indicative of a maximum number of acceptable requests over a period of time for requests similar to the received request. The maximum number of acceptable requests can include, for example, a range of requests (e.g., 10, 100, 1000, etc.) per second, minutes, and/or any other unit time. In addition, or alternatively, the rate limit can define a maximum queue length. The maximum queue length can define a maximum number of pending requests that can be queued for a software service. By way of example, the rate limit can define a maximum queue length of 100. In such a case, the operations computing system can queue a request to be serviced by the software service until the queue reaches 100 pending requests at which point the operations computing system can discard a request corresponding to the rate limit.

By way of example, the rate limit can include an in-memory leaky bucket approach. For each bucket, the operations computing system can meter the request rate by determining the next minimum allowable time a request can be processed. A request count can be maintained for each rate limit (e.g., bucket) and a queue can be used to store pending requests that cannot be immediately processed. For instance, a rate limit can include a maximum number of acceptable requests per second and a maximum number of acceptable pending requests that can be queued in excess of the rate limit.

The operations computing system can determine the rate limit corresponding to the request based on one or more attributes of the request. As examples, the rate limit can be determined based on the vehicle provider, the software service, current data, one or more environmental factors, etc. By way of example, the rate limit can be selected from a plurality of previously determined bucketized rate limits. The operations computing system can match the request to a rate limit bucket that is most similar to the request. For instance, the plurality of rate limits can include a rate limit bucket for requests associated with the vehicle provider, the requested software service, environmental attributes matching the current environmental conditions, and/or any combination therebetween. The operations computing system can select the rate limit by comparing the request to each rate limit bucket.

In some implementations, the operations computing system can modify the rate limit based on the one or more current environmental conditions. For example, the operations computing system can increase a threshold number of requests over time based on one or more current or expected surges in requests. An expected surge in requests can be predicted, for example, based on one or more emergency situations (e.g., evacuations due to hurricanes, earthquakes, tornadoes, etc.). In addition, the threshold number of requests over time can be decreased based on one or more current or expected harmful conditions such as, for example, rain, sleet, snow, etc. that may cause lower bandwidth availability and/or otherwise degrade the performance of the software services offered by the service entity. In addition, or alternatively, a rate limit can be modified based on one of more other factors such as, for example, an expected maintenance event (e.g., server maintenance), current or expected traffic events (e.g., expected surge in requests due scheduled entertainment events, etc.), and/or any other factor that can affect the frequency of requests to the backend software services of the service entity platform.

The operations computing system can determine a routing action for the request based at least in part on the rate limit. For example, the operations computing system can determine a routing action for the request based on a request history associated with the software service and the rate limit. The routing action can include a granting action associated with permitting access to the software service, a denial action associated with denying access to the software service, and/or a queueing action associated with storing the request for later processing. The granting action, for example, can include forwarding the request to the software service and/or any middleware associated with the software service. The denial action, for example, can include rejecting the request. And, the queueing action can include adding the request to a queue of pending requests.

In some implementations, the denial action can include generating an error message indicative of the rejection. The error message, for example, can indicate that the rate limit has been exceeded. The operations computing system can provide the error message to the vehicle provider. In addition, or alternatively, the error message can be logged in memory. The logged error message can include data indicative of the request such as, for example, the current data, the requested software service, the vehicle provider, etc.

As discussed herein, the request history can be indicative of a number of previously received requests. For example, the operations computing system can include a request counter that counts the requests received in a preceding period of time (e.g., requests received within a second, ten seconds, a minute, etc. of the current request, etc.). For instance, the request history can be a log of received requests over a period of time. The period of time can be any unit of time such as, for example, the preceding second, minute, etc. In some implementations, the request history can include a log of received requests over a period of time matching the period of time defined by one or more of the plurality of rate limits. For example, as described above, the operations computing system can maintain a request history for each of a plurality of bucketized rate limits. The request history can include a number of previously received requests that have been assigned to the respective bucket associated with the selected rate limit.

The operations computing system can determine whether the request and the number of previously received requests (e.g., as indicated by the request history) achieve the rate limit. For instance, the operations computing system can determine that the request and the number of previously received requests (e.g., as indicated by the request history) does not achieve (e.g., is lower than or equal to) the threshold number of acceptable request as defined by the rate limit. In response to determining that the number of previously received requests does not achieve the rate limit, the computing system can determine a granting action as the routing action for the request. In addition, or alternatively, the operations computing system can determine that the request and the number of previously received requests (e.g., as indicated by the request history) achieves (e.g., exceeds or is equal to) the threshold number of requests as defined by the rate limit. In response to determining that the request and the number of previously received requests achieve the rate limit, the operations computing system can determine a denial action as the routing action for the request.

The operations computing system can initiate the routing action. By way of example, the operations computing system can initiate the provisioning of the request to the backend software service in the event that a granting action is determined for the request. In addition, or alternatively, for example, in the event that a denial action is determined for the request, the operations computing system can deny the request by discarding the request. In some implementations, the operations computing system can initiate the generation of an error message and the provisioning of the error message to the vehicle provider. The request and/or data associated with the request (e.g., logged error message) can be logged in memory at the operations computing system.

In some implementations, the operations computing system can update the rate limit based, at least in part, on the request and/or the current data. For example, the operations computing system can be configured to update the rate limit (and/or any of the predetermined bucketized rate limits) at a dynamic and/or static frequency. For instance, the operations computing system can dynamically update the rate limit based on a number of times the threshold number of requests over the period of time is achieved. By way of example, the operations computing system can adjust a rate limit in the event that the threshold number of requests is exceeded on a regular basis (e.g., multiple times a minute, hour, day, week, etc.). In addition, or alternatively, the update frequency can be statically set. For example, the operations computing system can be configured to update the plurality of rate limits at a defined frequency such as, for example, once a day, week, month, etc. For instance, the operations computing system can access logged data (e.g., a plurality of logged error messages, etc.) at the defined frequency, determine one or more trends (e.g., one or more similar reoccurring errors (e.g., by the same vehicle provider, for the same or similar backend software service, within the same time range, during matching environmental conditions or attributes, etc.)), and adjust the one or more rate limits based, at least in part, on the one or more trends.

As one example, the operations computing system can determine an initial set of rate limits. The initial set of rate limits can include a rate limit bucket for each of the plurality of vehicle providers associated with the service entity. In some implementations, the initial set of rate limits can be determined for each respective vehicle provider of the plurality of vehicle providers based, at least in part, on the size of a fleet of vehicles associated with the respective vehicle provider. The operations computing system can automatically update (e.g., on a dynamic frequency, on a static frequency, etc.) the rate limit bucket (e.g., increase/lower the size, etc.) for each of the vehicle providers based, at least in part, on a usage pattern of each of the vehicle providers. For example, the operations computing system can access a data structure (e.g., list, table, etc.) storing the rate limit and adjust the value(s) representing the rate limit within the data structure.

The systems and methods described herein provide a number of technical effects and benefits. For instance, by utilizing a bucketized mechanism for rate limiting incoming traffic to a number of software services, the computing system described herein can dynamically filter incoming traffic based on attribute specific to a respective software service or vehicle provider. This can improve autonomous vehicle operations by tailoring rate limits to the varied operational capabilities and needs of a plurality of different vehicles. This, in turn, can proactively identify malicious or rogue requests designed to starve resources of the system or otherwise cause performance degradation. Such bucketized rate limits, can therefore improve computing resources available to a computing system by filtering, processing, and analyzing incoming requests based on aspects of the request and historical information associated with the specific request. In addition, bucketized rate limits can enable a system to prioritize different software services based on the tasks accomplished by the software service. In this manner, the systems and method described herein can improve vehicle safety by prioritizing (e.g., allowing more requests to) software services involved with ensuring the safety of vehicle and/or passengers therein.

Example aspects of the present disclosure can provide a number of improvements to computing technology such as, for example, autonomous vehicle and/or ridesharing computing technology. For instance, the systems and methods of the present disclosure can provide an improved approach for filtering messages for access to a plurality of backend software services. For example, a computing system can obtain a request for access to a software service for facilitating one or more transportation services. The system can determine a vehicle provider associated with the request. The system can determine a rate limit corresponding to the request based on the vehicle provider or the software service. The system can determine a routing action for the request based on a request history associated with the vehicle provider and the rate limit corresponding to the request. And, the system can initiate the routing action.

In this manner, the computing system can employ improved rate limiting techniques to selectively filter requests to a number of software services based on a number of aspects associated with the request. To this end, the computing system can accumulate and utilize newly available information such as, for example, dynamic rate limits, service attributes, provider attributes, service-provider attributes. The dynamic rate limits can be uniquely tailored to each of a plurality of software services or vehicle providers. In this way, the computing system provides a practical application that enables the lightweight, easy to maintain, and uniquely tailored rate limitations to selectively filter network traffic, while prioritizing different components (e.g., service providers, vehicles, etc.) of a service entity.

Various means can be configured to perform the methods and processes described herein. For example, a computing system can include data obtaining unit(s), authorization unit(s), rate limiter unit(s), routing action unit(s), initiation unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., data obtaining unit(s), etc.) can be configured to obtain a request for access to a software service for facilitating one or more transportation services. The means (e.g., authorization unit(s), etc.) can be configured to determine a vehicle provider associated with the request. The means (e.g., rate limiter unit(s), etc.) can be configured to determine a rate limit corresponding to the request based, at least in part, on the vehicle provider or the software service. The rate limit can define a threshold number of requests over a period of time. The means (e.g., routing action unit(s), etc.) can be configured to determine a routing action for the request based, at least in part, on a request history associated with the vehicle provider and the rate limit corresponding to the request. In addition, the means (e.g., initiation unit(s), etc.) can be configured to initiate the routing action.

With reference now to FIGS. 1-9, example implementations of the present disclosure will be discussed in further detail. FIG. 1 depicts a block diagram of an example system 100 for controlling the navigation of a vehicle according to example implementations of the present disclosure. As illustrated, FIG. 1 shows an example system 100 that can include an autonomous vehicle 102, an operations computing system 104, one or more remote computing devices 106, a communication network 108, a vehicle computing system 112, one or more sensors 114, sensor data 116, a positioning system 118, an autonomy computing system 120, map data 122, a perception system 124, a prediction system 126, a motion planning system 128, state data 130, prediction data 132, motion plan data 134, a communication system 136, a vehicle control system 138, and a human-machine interface 140.

The operations computing system 104 can be associated with a service provider (e.g., service entity) that can provide one or more vehicle services to a plurality of users via a fleet of vehicles (e.g., service entity vehicles, third-party vehicles, etc.) that includes, for example, the autonomous vehicle 102. The vehicle services can include transportation services (e.g., rideshare services), courier services, delivery services, and/or other types of services.

The operations computing system 104 can be configured to monitor and communicate with the autonomous vehicle 102 and/or its users to coordinate a vehicle service provided by the autonomous vehicle 102. This can include managing a database that stores data such as vehicle status data associated with the status of vehicles including autonomous vehicle 102. The vehicle status data can include a state of a vehicle, a location of a vehicle (e.g., a latitude and longitude of a vehicle), the availability of a vehicle (e.g., whether a vehicle is available to pick-up or drop-off passengers and/or cargo, etc.), and/or the state of objects internal and/or external to a vehicle (e.g., the physical dimensions and/or appearance of objects internal/external to the vehicle).

The operations computing system 104 can include multiple components for performing various operations and functions. For example, the operations computing system 104 can include and/or otherwise be associated with the one or more computing devices that are remote from the autonomous vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with the operation of one or more vehicles (e.g., a fleet of vehicles), with the provision of vehicle services, and/or other operations as discussed herein.

For instance, the operations computing system 104 can include various sub-systems/back-end software services that are configured to perform various functions. For example, the operations computing system 104 can include one or more backend servers configured to host a plurality of backend software services for facilitating one or more transportation services. The plurality of backend software services can include a plurality of different services such as, for example, one or more trip assignment service(s), matching/deployment software service, routing service(s), supply positioning service(s), payment service(s), remote operator service(s), and/or any other software service that can contribute to the provisioning of a transportation service. As examples, the matching/deployment software service(s) can be configured to receive data indicative of a user service request (e.g., from a service provider computing system, etc.) for a vehicle service, identify a plurality of candidate vehicles available to perform at least a portion of a vehicle route, etc. The routing software service(s) can be configured to determine the vehicle route based on the user service request. And, the trip assignment service(s) can be configured to assign the user service request to a candidate vehicle.

The operations computing system 104 can communicate with the one or more remote computing devices 106 and/or the autonomous vehicle 102 via one or more communications networks including the communications network 108. The communications network 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the autonomous vehicle 102.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the autonomous vehicle 102 including exchanging (e.g., sending and/or receiving) data or signals with the autonomous vehicle 102, monitoring the state of the autonomous vehicle 102, and/or controlling the autonomous vehicle 102. The one or more remote computing devices 106 can communicate (e.g., exchange data and/or signals) with one or more devices including the operations computing system 104 and the autonomous vehicle 102 via the communications network 108.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the autonomous vehicle 102 including a location (e.g., latitude and longitude), a velocity, acceleration, a trajectory, and/or a path of the autonomous vehicle 102 based in part on signals or data exchanged with the autonomous vehicle 102. In some implementations, the operations computing system 104 can include the one or more remote computing devices 106.

The autonomous vehicle 102 can be a ground-based vehicle (e.g., an automobile, bike, scooter, other light electric vehicle, etc.), an aircraft, and/or another type of vehicle. The autonomous vehicle 102 can perform various actions including driving, navigating, and/or operating, with minimal and/or no interaction from a human driver. The autonomous vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the autonomous vehicle 102 can provide driving and navigational operation with minimal and/or no interaction from a human driver present in the vehicle. A semi-autonomous operational mode can be one in which the autonomous vehicle 102 can operate with some interaction from a human driver present in the vehicle. Park and/or sleep modes can be used between operational modes while the autonomous vehicle 102 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the autonomous vehicle 102. Additionally, the autonomous vehicle 102 can provide data indicative of the state of the vehicle, the state of one or more passengers of the vehicle, and/or the state of an environment to the operations computing system 104, which can store an indication, record, and/or other data indicative of the state of the one or more objects within a predefined distance of the autonomous vehicle 102 in one or more memory devices associated with the operations computing system 104 (e.g., remote from the vehicle). Furthermore, the autonomous vehicle 102 can provide data indicative of the state of the one or more objects (e.g., physical dimensions and/or appearance of the one or more objects) within a predefined distance of the autonomous vehicle 102 to the operations computing system 104, which can store an indication, record, and/or other data indicative of the state of the one or more objects within a predefined distance of the autonomous vehicle 102 in one or more memory devices associated with the operations computing system 104 (e.g., remote from the vehicle).

The autonomous vehicle 102 can include and/or be associated with the vehicle computing system 112. The vehicle computing system 112 can include one or more computing devices located onboard the autonomous vehicle 102. For example, the one or more computing devices of the vehicle computing system 112 can be located on and/or within the autonomous vehicle 102. The one or more computing devices of the vehicle computing system 112 can include various components for performing various operations and functions. For instance, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the autonomous vehicle 102 (e.g., its computing system, one or more processors, and other devices in the autonomous vehicle 102) to perform operations and functions, including those described herein.

As depicted in FIG. 1, the vehicle computing system 112 can include one or more sensors 114, the positioning system 118, the autonomy computing system 120, the communication system 136, the vehicle control system(s) 138, and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The sensor(s) 114 can be configured to generate and/or store data including the sensor data 116. The sensor data 116 can include the internal sensor data, external sensor discussed above, and well an autonomy sensor data associated with one or more objects that are proximate to the autonomous vehicle 102 (e.g., within range or a field of view of one or more of the one or more sensors 114 (e.g., external sensor(s)). For instance, the sensor(s) 114 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy sensor data can include image data, radar data, LIDAR data, and/or other data acquired by the sensor(s) 114. The one or more objects can include, for example, pedestrians, vehicles, bicycles, and/or other objects. The autonomy sensor data can be indicative of locations associated with the one or more objects within the surrounding environment of the autonomous vehicle 102 at one or more times. For example, the autonomy sensor data can be indicative of one or more LIDAR point clouds associated with the one or more objects within the surrounding environment. The sensor(s) 114 can provide autonomy sensor data to the autonomy computing system 120.

In addition to the sensor data 116, the autonomy computing system 120 can retrieve or otherwise obtain data including the map data 122. The map data 122 can provide detailed information about the surrounding environment of the autonomous vehicle 102. For example, the map data 122 can provide information regarding: the identity and location of different roadways, road segments, buildings, or other items or objects (e.g., lampposts, crosswalks and/or curb), the location and directions of traffic lanes (e.g., the location and direction of a parking lane, a turning lane, a bicycle lane, or other lanes within a particular roadway or other travel way and/or one or more boundary markings associated therewith), traffic control data (e.g., the location and instructions of signage, traffic lights, or other traffic control devices), and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the autonomous vehicle 102. The positioning system 118 can be any device or circuitry for analyzing the position of the autonomous vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the autonomous vehicle 102 can be used by various systems of the vehicle computing system 112 and/or provided to one or more remote computing devices (e.g., the operations computing system 104 and/or the remote computing device 106). For example, the map data 122 can provide the autonomous vehicle 102 relative positions of the surrounding environment of the autonomous vehicle 102. The autonomous vehicle 102 can identify its position within the surrounding environment (e.g., across six axes) based at least in part on the data described herein. For example, the autonomous vehicle 102 can process the autonomy sensor data (e.g., LIDAR data, camera data) to match it to a map of the surrounding environment to get an understanding of the vehicle's position within that environment (e.g., transpose the autonomous vehicle's 102 position within its surrounding environment).

The autonomy computing system 120 can include a perception system 124, a prediction system 126, a motion planning system 128, and/or other systems that cooperate to perceive the surrounding environment of the autonomous vehicle 102 and determine a motion plan for controlling the motion of the autonomous vehicle 102 accordingly. In some examples, many of the functions performed by the perception system 124, prediction system 126, and motion planning system 128 can be performed, in whole or in part, by a single system and/or multiple systems that share one or more computing resources. For instance, one or more of the perception system 124, prediction system 126, and motion planning system 128 can be combined into one system configured to perform the functions of each of the systems. In addition, or alternatively, the one or more of the perception system 124, prediction system 126, and motion planning system 128 can be configured to share and/or have access to one or more common computing resources (e.g., a shared memory, communication interfaces, processors, etc.).

As an example, the autonomy computing system 120 can receive the sensor data 116 from the one or more sensors 114, attempt to determine the state of the surrounding environment and/or the vehicle's interior by performing various processing techniques on the sensor data 116 (and/or other data). The autonomy computing system 120 can generate an appropriate motion plan through the surrounding environment based on state of the surrounding environment and the vehicle's interior. In some examples, the autonomy computing system 120 can use the sensor data 116 as input to a one or more machine-learned models that can detect objects within the sensor data 116, forecast future motion of those objects, and select an appropriate motion plan for the autonomous vehicle 102. The machine-learned model(s) can be included within one system and/or share one or more computing resources.

As another example, the perception system 124 can identify one or more objects that are proximate to and/or within the autonomous vehicle 102 based on sensor data 116 received from the sensor(s) 114. In particular, in some implementations, the perception system 124 can determine, for each object, state data 130 that describes the current state of such object. As examples, the state data 130 for each object can describe an estimate of the object's: current location (e.g., relative to one or more interior vehicle components, the surrounding environment of the vehicle, etc.); current speed; current heading (which may also be referred to together as velocity); current acceleration; current orientation (e.g., with respect to the direction of travel of the vehicle, etc.); size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 124 can determine state data 130 for each object over a number of iterations. In particular, the perception system 124 can update the state data 130 for each object at each iteration. Thus, the perception system 124 can detect and track objects (e.g., vehicles, bicycles, pedestrians, etc.) that are proximate and/or within the autonomous vehicle 102 over time, and thereby produce a presentation of the world around and within the vehicle 102 along with its state (e.g., a presentation of the objects of interest within a scene/vehicle interior at the current time along with the states of the objects).

The prediction system 126 can receive the state data 130 from the perception system 124 and predict one or more future locations and/or moving paths for each object based on such state data 130. For example, the prediction system 126 can generate prediction data 132 associated with each of the respective one or more objects proximate and/or within the vehicle 102. The prediction data 132 can be indicative of one or more predicted future locations of each respective object. The prediction data 132 can be indicative of a predicted path (e.g., predicted trajectory) of at least one object within the interior and/or the surrounding environment of the autonomous vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the autonomous vehicle 102 based at least in part on the prediction data 132 (and/or other data). The motion plan data 134 can include vehicle actions with respect to the objects proximate to the autonomous vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the autonomous vehicle 102 can perform a certain action (e.g., pass an object) without increasing the potential risk to the autonomous vehicle 102 and/or violating any traffic laws (e.g., speed limits, lane boundaries, signage). The motion plan data 134 can include a planned trajectory, velocity, acceleration, and/or other actions of the autonomous vehicle 102.

As one example, in some implementations, the motion planning system 128 can determine a cost function for each of one or more candidate motion plans for the autonomous vehicle 102 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle 102 approaches impact with another object and/or deviates from a preferred pathway (e.g., a predetermined travel route).

Thus, given information about the current locations and/or predicted future locations and/or moving paths of objects, the motion planning system 128 can determine a cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle control system 138 that controls one or more vehicle controls (e.g., actuators or other devices that control gas flow, steering, braking, etc.) to execute the selected motion plan.

The motion planning system 128 can provide the motion plan data 134 with data indicative of the vehicle actions, a planned trajectory, and/or other operating parameters to the vehicle control systems 138 to implement the motion plan data 134 for the autonomous vehicle 102.

The vehicle computing system 112 can include a communications system 136 configured to allow the vehicle computing system 112 (and it's one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections, etc.). In some implementations, the communications system 136 can allow communication among one or more of the systems on-board the autonomous vehicle 102. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include one or more human-machine interfaces 140. For example, the vehicle computing system 112 can include one or more display devices located on the vehicle computing system 112. A display device (e.g., screen of a tablet, laptop, and/or smartphone) can be viewable by a user of the autonomous vehicle 102 that is located in the front of the autonomous vehicle 102 (e.g., driver's seat, front passenger seat). Additionally, or alternatively, a display device can be viewable by a user of the autonomous vehicle 102 that is located in the rear of the autonomous vehicle 102 (e.g., a passenger seat in the back of the vehicle).

Figure 2:
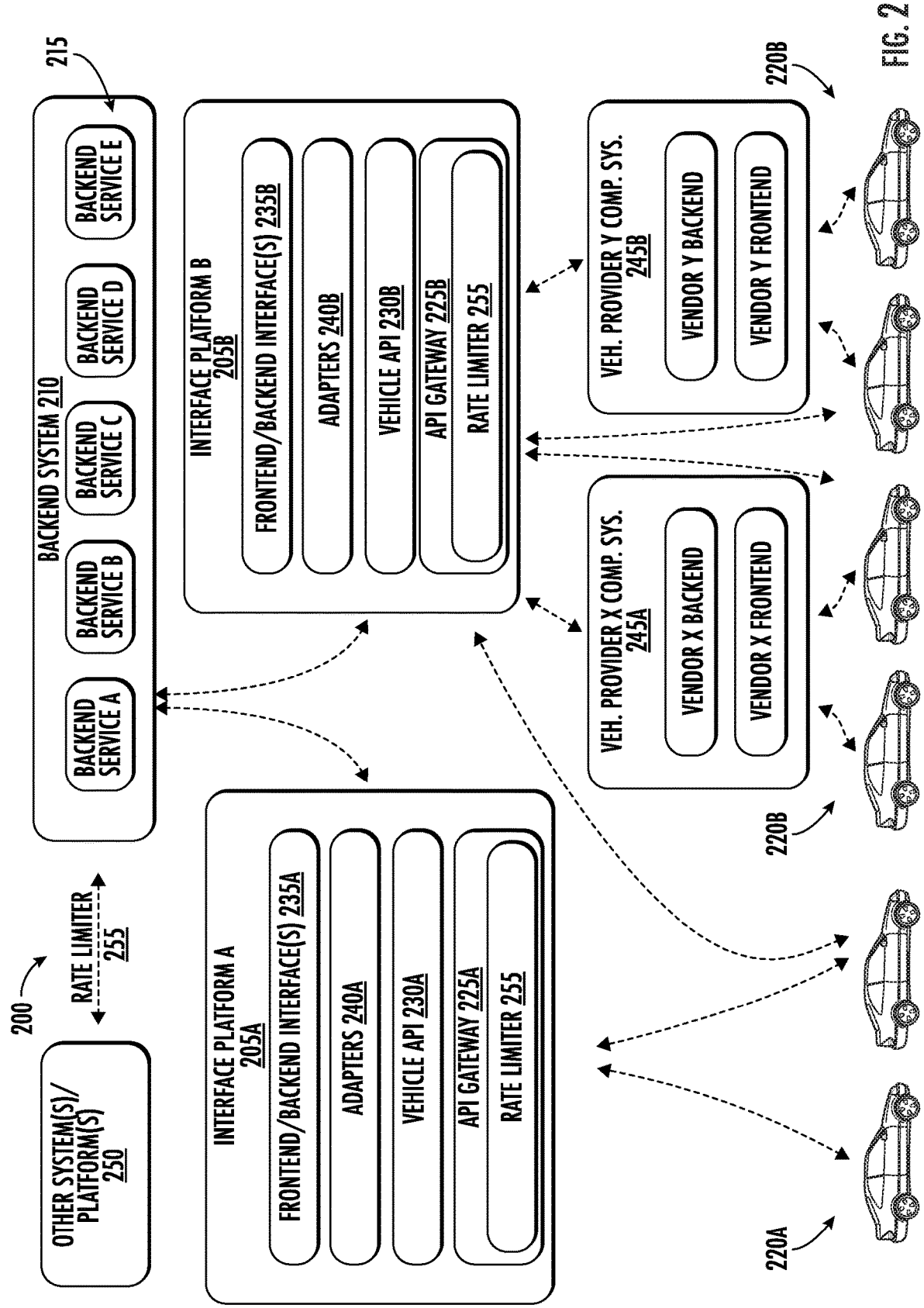
FIG. 2 depicts an example infrastructure system according to example embodiments of the present disclosure.

FIG. 2 depicts an example service infrastructure 200 according to example implementations of the present disclosure. The service infrastructure 200 can include one or more systems, interfaces, and/or other components that can be included in an operations computing systems of the service entity for coordinating vehicle services and managing/supporting the autonomous vehicle associated therewith. The service infrastructure 200 can represent, for example, the architecture of a service platform of the operations computing system for coordinating and providing one or more vehicle services (e.g., via autonomous vehicle(s), etc.).

The service infrastructure 200 of an operations computing system can include a first application programming interface platform 205A, a second application programming interface application platform 205B, and/or a backend system 210 with one or a plurality of backend services 215. These components can allow the service infrastructure 200 (e.g., the operations computing system) to communicate with one or more autonomous vehicles and/or one or more other systems.

The first application programming interface platform 205A can facilitate communication with one or more autonomous vehicles of the service entity. For example, as described herein, the service entity may own, lease, etc. a fleet of autonomous vehicles 220A that can be managed by the service entity (e.g., its backend services) to provide one or more vehicle services. The autonomous vehicle(s) 220A can be utilized by the service entity to provide the vehicle service(s) and can be included in the fleet of the service entity. Such autonomous vehicle(s) may be referred to as "service entity autonomous vehicles" or "first party autonomous vehicles."

The first application programming interface platform 205A can include a number of components to help facilitate the support, coordination, and management of the first party autonomous vehicles 220A associated with the service entity. The first application programming interface platform 205A (e.g., a private platform, etc.) can provide access to one or more backend services 215 that are available to the first party autonomous vehicles 220A. To help do so, the first application programming interface platform 205A can include a first API gateway 225A. The first API gateway 225A can function as a proxy for application programming interface (API) calls and can help return an associated response. The first API gateway 225A can help provide other support functions for the service infrastructure 200 such as, for example, authentication functions, etc. An authentication function, for example, can include rate limiting requests to the backend services 215. For instance, as discussed in greater detail herein, the first gateway API 225A can include a rate limiter 255 configured to limit requests for access to the backend services 215.

The first application programming interface platform 205A can include one or more APIs such as, for example, a first vehicle API 230A. The vehicle API 230A can include a library and/or parameters for facilitating communications between the first party autonomous vehicles 225A and the backend service(s) 215 of the backend system 210. For example, the first vehicle API 230A can be called by a first party autonomous vehicle 220A and/or another system to help communicate data, messages, etc. to and/or from an autonomous vehicle. The first vehicle API 230A can provide for communicating such information in a secure, bidirectional manner that allows for expanded processing of data offboard a vehicle, analyzing such data in real time, and/or the like.

The first application programming interface platform 205A can include first frontend/backend interface(s) 235A. Each first frontend/backend interface 235A can be associated with a backend service 215 of the backend system 210. The first frontend/backend interface(s) 235A can serve as interface(s) for one client (e.g., an external client such as a first party autonomous vehicle 220A) to provide data to another client (e.g., a backend service 215). In this way, the frontend/backend interface(s) 235A can be external facing edge(s) of the first application programing interface platform 205A that are responsible for providing secure tunnel(s) for first party autonomous vehicles 220A to communicate with the backend system 215 (and vice versa) so that a particular backend service can be accessed by a particular first party autonomous vehicle 220A.

In some implementations, the first application programing interface platform 205A can include one or more first adapters 240A, for example, to provide compatibility between one or more first frontend/backend interfaces 235A and one or more of the API(s) associated with the first application programming interface platform 205A (e.g., vehicle API 230A). The first adapter(s) 240A can provide upstream and/or downstream separation between particular infrastructure components, provide or assist with data curation, flow normalization and/or consolidation, etc.

The second application programming interface platform 205B (e.g., a public platform, etc.) can facilitate communication with one or more autonomous vehicles of a third party vehicle provider. As described herein, a third party vehicle provider can be an entity that makes one or more of its autonomous vehicles available to the service entity for the provision of vehicle services. This can include, for example, an individual, an original equipment manufacturer (OEM), a third party vendor, or another entity that places autonomous vehicle(s) online with the service platform of the service entity such that the autonomous vehicle(s) can provide vehicle services of the service entity. These autonomous vehicles may be referred to as "third party autonomous vehicles" and are shown in FIG. 2 as third party autonomous vehicles 220B. Even though such autonomous vehicles may not be included in the fleet of autonomous vehicles of the service entity, the service infrastructure 200 (e.g., of the service entity's service platform, etc.) can allow the third party autonomous vehicles 220B to provide vehicle services offered by the service entity, access one or more backend services 215 of the backend system 210, etc.

The second application programming interface platform 205B can allow the service platform to communicate directly or indirectly with autonomous vehicle(s). In some implementations, a third party autonomous vehicle 220B may call an API of, send data/message(s) to, receive data/message(s) from/directly through, etc. the second application programming interface platform 205B.

Additionally, or alternatively, another computing system can serve as an intermediary between the third party autonomous vehicles 220B and the second application programming interface platform 205B (and the service platform associated therewith). For example, the service infrastructure 200 can be associated with and/or in communication with one or more third party vehicle provider computing systems 245, such as a vehicle provider X computing system and a vehicle provider Y computing system. Each third party vehicle provider X, Y can have its own, separate third party autonomous fleet including respective third party autonomous vehicles 220B. The third party vehicle provider computing systems 245 can be distinct and remote from the service infrastructure 200 and provide for management of vehicles associated with that particular third party vehicle provider. As shown in FIG. 2, a third party vehicle provider computing system 245 can include its own backends and/or frontends for communicating with other systems (e.g., third party autonomous vehicle(s) 220B, operations computing system, etc.).

The third party computing system(s) 245A-B associated with a particular third party autonomous vehicle fleet can serve as the communication intermediary for that fleet. For example, third party autonomous vehicles 220B associated with third party vehicle provider X can communicate with the third party vehicle provider X computing system 245A which can then communicate with the service infrastructure 200 (e.g., to access the available backend services 215) via the second application programming interface platform 205B. Data from the service infrastructure 200 (e.g., the backend services 215) can be communicated to the vehicle provider X computing system 245A (e.g., via the second application programming interface platform 235B) and then to the third party autonomous vehicles 220B associated with third party vehicle provider X. In another example, third party autonomous vehicles 220B associated with third party vehicle provider Y can communicate with the third party vehicle provider Y computing system 245B which can then communicate with the service infrastructure 200 (e.g., to access the available backend services 215) via the second application programming interface platform 205B. Data from the service infrastructure 200 (e.g., the backend services 215) can be communicated to the third party vehicle provider Y computing system 245B (e.g., via the second application programming interface platform 205B) and then to the third party autonomous vehicles 220B associated with third party vehicle provider Y.

The second application programming interface platform 205B can include a number of components to help facilitate the support, coordination, and management of the third party autonomous vehicles 220B associated with the third party vehicle providers. The second application programming interface platform 205B can provide access to one or more backend services 215 that are available to the third party autonomous vehicles 220B. To help do so, the second application programming interface platform 205B can include a second API gateway 225B. The second API gateway 225B can function as a proxy for application programming interface (API) calls and can help to return an associated response. The second API gateway 225B can help provide other support functions for the service infrastructure 200 such as, for example, authentication functions, etc. An authentication function, for example, can include rate limiting requests to the backend services 215. For instance, as discussed in greater detail herein, the second gateway API 225B can include a rate limiter 255 configured to limit requests for access to the backend services 215.

The second application programming interface platform 205B can include one or more APIs such as, for example, a second vehicle API 230B. The second vehicle API 230B can include a library and/or parameters for facilitating communications between the third party autonomous vehicles 220B and the backend service(s) 215 of the backend system 210. For example, the second vehicle API 230B can be called by a third party autonomous vehicle 220B and/or another system (e.g., a third party vehicle provider computing system 245, etc.) to help communicate data, messages, etc. to and/or from an autonomous vehicle and/or other system. The second vehicle API 230B can provide for communicating such information in a secure, bidirectional manner.

The second application programming interface platform 205B can include second frontend/backend interface(s) 235B. Each of the second frontend/backend interface(s) 235B can be associated with a backend service 215 of the backend system 210. The second frontend/backend interface(s) 235B can serve as interface(s) for one client (e.g., an external client such as a third party autonomous vehicle 220B, a third party vehicle provider computing system 245) to provide data to another client (e.g., a backend service 215). In this way, the second frontend/backend interface(s) 235B can be external facing edge(s) of the second application programing interface platform 205B that are responsible for providing secure tunnel(s) for third party autonomous vehicles 220B (and/or other intermediary systems) to communicate with the backend system 210 (and vice versa) so that a particular backend service 215 can be utilized. In some implementations, the second application programing interface platform 205B can include one or more second adapters 240B, for example, to provide compatibility between one or more second frontend/backend interfaces 235B and one or more of the API(s) associated with the second application programming interface platform 205B (e.g., vehicle API 230B).

In some implementations, the first party autonomous vehicles 220A can utilize the second application programming interface platform 205B to access/communicate with the service platform/backend service(s) 215. This can allow for greater accessibility and/or back-up communication options for the first party autonomous vehicles 220A.

The backend system 210 can host, store, execute, etc. one or more backend services 215. The backend service(s) 215 can be implemented by system client(s), which can include hardware and/or software that is remote from the autonomous vehicles and that provide a particular service to an autonomous vehicle. The backend service(s) 215 can include a variety of services that help coordinate the provision of vehicle service(s) and support the autonomous vehicles and/or the third party vehicle providers performing/providing those vehicle service(s).

By way of example, the backend software services 215 accessible to the autonomous vehicles during the performance of a vehicle service can include supply positioning service(s) to route the vehicle to a location (e.g., an expected high density area, etc.) after/before a vehicle service, payment service(s) (e.g., to process payments for the vehicle service), remote assistance/operator service(s) (e.g., to control the vehicle in one or more potentially hazardous circumstances, etc.), and/or any other software service that can contribute to the performance of a vehicle service. As another example, the backend software services 215 accessible to a service provider computing system (e.g., the service entity, the vehicle providers 245A, 245B, the other system(s)/platform(s) 250, etc.) before the performance of a vehicle service can include a matching service, an itinerary service, and/or any other software service that can contribute to the scheduling/assignment of the vehicle service. This back-end service can also, or alternatively, provide a response to a service provider computing system to indicate that an autonomous vehicle would be available for a user. This can allow the service provider computing system to offer an autonomous vehicle as option for the vehicle service for the user (e.g., via a user interface of an application running on a user device). The backend software services can be provided and maintained at backend system 210 (e.g., of the operations computing system 104) configured to process a plurality of requests for access (e.g., from vehicles, vehicle providers, service provider computing systems, etc.) to one or more of the software services.

More particularly, the backend service(s) 215 can include a matching service that is configured to match an autonomous vehicle and/or an autonomous vehicle fleet with a service request for vehicle services. Based on a match, the matching service can generate and communicate data indicative of a candidate vehicle service assignment (indicative of the requested vehicle service) for one or more autonomous vehicles. In some implementations (e.g., for first party autonomous vehicle(s) 220A), the candidate vehicle service assignment can include a command that a first party autonomous vehicle 220A is required to accept, unless it would be unable to safely or fully perform the vehicle service. In some implementations (e.g., for third party autonomous vehicle(s) 220B), the candidate vehicle service assignment can include a request or offer for one or more autonomous vehicles to provide the vehicle service. The candidate vehicle service assignment can be communicated to one or more third party vehicle provider computing systems 245 and/or one or more autonomous vehicle(s) 220B (e.g., via the interface platform B 205B) and/or one or more autonomous vehicle(s) 220A (e.g., via the interface platform A 205A). The candidate vehicle service assignment can be accepted and/or rejected. If accepted, an autonomous vehicle 220A, 220B can be associated (e.g., assigned to service, etc.) with the vehicle service assignment. The candidate vehicle service assignment can include data indicative of the user, a route, an origin location for the vehicle service, a destination location for the vehicle service, service parameters (e.g., time restraints, user accommodations/preferences, etc.), and/or any other information associated with vehicle service.

The backend service(s) 215 can include an itinerary service. The itinerary service can be configured to maintain, update, track, etc. a data structure indicative of one or more task(s) and/or candidate task(s) associated with a particular autonomous vehicle, autonomous vehicle fleet, and/or vehicle provider. The tasks can include, for example, vehicle service assignments for providing vehicle services and/or tasks associated with an activity other than the performance of a vehicle service. For example, the tasks can include: a testing task (e.g., for testing and validating autonomy software, hardware, etc.); a data acquisition task (e.g., acquiring sensor data associated with certain travel ways, etc.); a re-positioning task (e.g., for moving an idle vehicle between vehicle service assignments, to high demand areas, etc.); a circling task (e.g., for travelling within a current geographic area in which a vehicle is located (e.g., circle the block or neighborhood), etc.); a maintenance task (e.g., for instructing travel to a service depot to receive maintenance, etc.); a re-fueling task; a vehicle assistance task (e.g., where a vehicle travels to assist another vehicle, etc.); a deactivation task (e.g. going offline such that a vehicle, fleet of vehicles, or vehicle providers no longer accept service request, etc.); a parking task; and/or other types of tasks. The itinerary service can maintain an itinerary for an autonomous vehicle, fleet, vehicle provider, etc. The itinerary can serve as a queue for the various tasks. In some implementations, the tasks can be associated with a priority or order for which they are deployed to an autonomous vehicle, fleet, vehicle provider, etc.

In some implementations, the vehicle service assignment can be associated with a multi-modal vehicle service. For example, the user may request and/or be provided a multi-modal user itinerary by which the user is to travel to the user's ultimate destination via two or more types of transportation modalities (e.g., ground based vehicle, aerial vehicle, public transit, etc.). As such, the origin location and/or destination location identified in the vehicle service assignment may include intermediate locations (e.g., transfer points) along the user's multi-modal itinerary.

The backend service(s) 215 can include a deployment service that communicates tasks for an autonomous vehicle to complete. For example, the deployment service can communicate data indicative of a vehicle service assignment and/or another task to an autonomous vehicle (or an intermediary system). The deployment service can communicate such data to an autonomous vehicle (or an intermediary system) based at least in part on the itinerary associated therewith. By way of example, the highest priority task and/or the task that is next in order can be deployed.

The backend services 215 can include a routing service. The routing service can be configured to provide an autonomous vehicle with a route for a vehicle service and/or another task. The route can be based at least in part on factors associated with the geographic area in which the autonomous vehicle is (or will be) travelling (e.g., weather, traffic, events, etc.). Additionally, or alternatively, the route can be based at least in part the autonomy capabilities of the autonomous vehicle (e.g., ability to complete an unprotected left-hand turn, U-turn, etc.). In some implementations, the routing service can be configured to assign, coordinate, monitor, adjust, etc. one or more designated pick-up and/or drop-off zones for the vehicle service(s). The routing service can be available to first party autonomous vehicles 220A. In addition, or alternatively, the routing service can be available to third party autonomous vehicles 220B if permitted/requested by an associated third party vehicle provider.

The backend services 215 can include a rider experience service. The rider experience service can be configured to communicate data to a rider associated with the vehicle service. This can include, for example, upcoming vehicle actions, routes, drop-off zones, user adjustable vehicle conditions (e.g., music, temperature, etc.). Such information can be presented via a display device of an onboard tablet associated with an autonomous vehicle, a user device associated with the rider, etc. through a software application associated with the service entity.

The backend services 215 can include a remote assistance service. The remote assistance service can be configured to provide remote assistance to an autonomous vehicle and/or a user (e.g., a rider associated with the vehicle service, etc.). For example, a remote assistance operator can take over control of one or more vehicle operations and/or otherwise assist an autonomous vehicle during the one or more vehicle operations. By way of example, a remote assistance operator can remotely control the navigation of an autonomous vehicle to navigate the vehicle around/past an unexpected obstruction in a travel way (e.g., a fallen tree, etc.). In another example, the remote assistance operator can communicate with a user (e.g., via the onboard tablet, user's phone, etc.) in the event that the user is in need of help.

The backend services 215 can include a simulation/testing service. The simulation/testing service can help facilitate vehicle provider integration with the service platform. For example, simulation/testing service can provide testing environments for vehicle providers to simulate communications and/or the performance of vehicle services using the service infrastructure 200.

The backend services 215 can include one or more other services. This can include, for example, payment services, vehicle rating services, health and maintenance services, software update/deployment services, and/or any other services for facilitating vehicle services.

In some implementations, one or more backend services 215 that are available to the first party autonomous vehicles 220A (e.g., via the first application programming interface platform 205A) may not be available to the third party autonomous vehicles 220B (e.g., via the second application programming interface platform 205B), and vice versa. For example, a software update/deployment service for the first party autonomous vehicles 220A may not be accessible or suitable for a third party autonomous vehicle 220B that utilizes the onboard autonomy software of a third party vehicle provider (not the service entity). As such, a software update/deployment backend service may not be able to communicate with a third party autonomous vehicle 220B and/or vice versa.

In some implementations, the service infrastructure 200 can include a test platform for validating and vetting end-to-end platform functionality, without use of a real vehicle on the ground. For example, the test platform can simulate trips with human drivers and/or support fully simulated trip assignment and/or trip workflow capabilities. For example, the test platform can simulate and monitor data traffic through the service infrastructure 200 to ensure proper functioning. In some implementations, the testing platform can access the simulation/testing backend to help facilitate a test or simulation.

In some implementations, the service infrastructure 200 can utilize a plurality of software development kits (SDKs) that help provide access to the first and second application programming interface platforms 205A, 205B. All (or a portion of) external communication with the platforms can be done via the SDKs. For example, the SDKs can include a first SDK (e.g., private SDK) and a second SDK (e.g., public SDK) and specific endpoints to facilitate communication with the first and second application programming interface platforms 205A, 205B, respectively. In some implementations, the first party autonomous vehicle(s) 220A (and/or a test platform) can use both the first and second SDKs, whereas the third party autonomous vehicles 220B and/or the third party vehicle provider computing systems 245 can use only the second SDK and associated endpoints. In some implementations, the SDKs can provide a single entry point, which can improve consistency across both the service provider fleet and the third party entity fleet(s). As an example, a second SDK can provide secured access to the second application interface platform 205B and access to capabilities such as vehicle service assignments, routing, and/or the like. The first SDK can be accessed by the first party autonomous vehicles 205A and provide access to capabilities including those available only to the first party autonomous vehicles 205A.

In some implementations, the SDKs can include a command-line interface to provide an entry point into the SDK components and act as a gateway for SDK related work, integration, testing, and authentication. For example, the command-line tools can provide for bootstrapping, managing authentication, updating SDK version, testing, debugging, and/or the like. In some implementations, a command-line interface can require an authentication certificate before being able to bootstrap an SDK, download components, and/or access a service entity's services. For example, based on the authentication certificate, a command-line interface can determine which version of the SDK to which to provide access. In some implementations, SDKs can be implemented onboard a first or third party autonomous vehicle 220A, 220B and/or a third party vehicle provider computing system 245.

In some implementations, the service infrastructure 200 can facilitate communication between the service platform and one or more other system(s)/platform(s) 250 of the service entity/operations computing system. By way of example, the service entity may have (e.g., the operations computing system may include, etc.) one or more other system(s)/platform(s) 250 for facilitating one or more vehicle and/or vehicle services. By way of example, the other system(s)/platform(s) 250 can include a system configured to indicate one or more services/vehicles that are available to a user and/or other system. As another example, the other system(s)/platform(s) 250 can include a system configured to coordinate the provision of vehicle services by human-driven vehicles and/or vehicle services that are specifically associated with certain types of services (e.g., delivery services, aerial transport services, etc.). The other system(s)/platform(s) 250 may communicate with the service platform utilizing the service infrastructure 200 to determine, for example, whether any autonomous vehicles would be available to a user for any potential vehicle services.

Various service provider computing systems such as, for example, systems of the service entity, the vehicle providers 245A, 245B, and/or the other system(s)/platform(s) 250, can receive a user service request (e.g., from a user device, another computing system, etc.) for a vehicle service. The service provider computing system can generate a request for access to the one or more backend services 215 of the backend system 215 facilitate one or more aspects (e.g., matching, routing, etc.) of the request service. The service provider computing systems can provide data indicative of a request to access the backend service(s) 215 of the backend system 210 to facilitate such functions. This can include data indicative of the user service request (e.g., associated locations, request attributes, etc.), as further described herein. In some implementations, the request for access to the backend service(s) 215 can indicate particular vehicle provider(s). For instance, the backend service(s) 215 can determine that the associated user service request would likely be matched to the vehicles of a particular vehicle provider (e.g., based on a certain vehicle make/model that can be found within that particular vehicle provider's fleet, etc.). A vehicle provider can be "matched" (e.g., determined based on the request) such that an autonomous vehicle within that vehicle provider's fleet is assigned to (or requested to) provide the vehicle service specified in the user service request.

As an example, the backend system 210 (e.g., operations computing system 104, etc.), via a matching/deployment software service, can receive data indicative of a user service request for a vehicle service. The vehicle service can be associated with a user. As discussed herein, the backend system 210 (e.g., operations computing system 104, the matching/deployment software service(s), etc.)) can receive the data indicative of the service request for a vehicle service from a service provider computing system (e.g., service entity, vehicle providers 245A, 245B, etc.). The service provider computing system can obtain the user service request from a user of the service entity and/or a respective vehicle provider associated with the service entity.

The user service request can include data indicative of a start location and an end location. For example, the service request can be associated with a vehicle service for a user from the start location (e.g., a requested origin, etc.) to the end location (e.g., a requested destination, etc.). As another example, the user service request can be associated with a vehicle service for one or more items (e.g., items/products for personal delivery, bulk items for business, freight transportation, baggage, other payloads, etc.) from the start location to the end location.

The backend system 210 (e.g., operations computing system 104, etc.), via routing software service(s), can determine a vehicle route from the start location to the end location. For instance, the backend system 210 (e.g., operations computing system 104, routing software service(s), etc.) can access map data indicative of the start location and the end location. The backend system 210 (e.g., operations computing system 104, routing software service(s), etc.) can determine the vehicle route based at least in part on the map data. For example, the vehicle route can include one or more directions based at least in part on the map data. The directions, for example, can include one or more vehicle maneuvers (e.g., driving maneuvers, etc.) and/or geographic areas necessary to transport the user and/or items from the start location to the end location. In some implementations, the directions can include one or more command instructions for controlling a vehicle (e.g., an autonomous vehicle) to travel along the vehicle route.

A vehicle can include human-driven and/or autonomous vehicles of a vehicle provider. As described herein, the vehicle providers can include the service entity (supplying first party autonomous vehicles 220A) and/or one or more third-party vehicle providers (supplying third party autonomous vehicles 220B). The backend system 210 associated with the service entity can provide a plurality of back-end software services 215 for facilitating the vehicle service after a route is determined and a candidate vehicle is assigned for the vehicle service. The plurality of backend software services 215, for example, can be accessible to each of the vehicles, vehicle providers, and/or a service provider computing systems before, during, and/or after the performance of a vehicle service.

If unchecked, a number of requests (e.g., from vehicle providers, the service provider computing system, malicious parties, etc.) can overload backend services 215 and/or the server(s) (e.g., a backend system 210) hosting the services such that the performance of the service(s) 215 and/or the servers(s) can be impaired. An operations computing system can utilize dynamic bucketized rate limiters (e.g., rate limiter 255) to prevent the overload of such services 215 and/or servers. The rate limiter 255, can protect the service(s) 215 and/or server(s) from attacks designed to overload the service(s)/server(s) by limiting the number of acceptable requests to a server and/or service over a period of time (e.g., one second, min, etc.). As described herein, the operations computing system can determine one or more dynamic bucketized rate limits for each software service provided by a service entity and/or each vehicle provider associated with the service entity based on attributes of the software service(s), the vehicle provider(s) requesting access to the software service(s), and/or current data (e.g., time, environmental conditions that may affect the integrity of the service (e.g., rain can cause bandwidth problems thus requiring a lower rate limit), etc.).

For example, an operations computing system including the interface platforms 205 can include a rate limiter 255. The rate limiter 255 can include an initial bucketing mechanism for rate limiting requests that can include tunable and/or expandable rate limiting buckets. The buckets can expand as the number and usage rate of backend software services 215 provided by the service entity expand. Such rate limiters can be lightweight, easy to maintain, and enable per-partner (e.g., vehicle provider) rate limits. In this manner, the bucketing mechanisms for rate limiting incoming traffic from vehicle providers, service provider computing systems, etc. can prevent requests to one service and/or from/to one vehicle provider from starving computing resources available to other services or vehicle providers, as well as the vehicles associated therewith.

For instance, as illustrated by FIG. 2, the interface platforms 205 can include a communication gateway (e.g., API gateways 225) configured to filter a plurality of requests before the requests are routed to a respective backend software service 215 and/or vehicle provider. The communication gateway, for example, can act as a gate between one or more servers of an operations computing system (e.g., backend system 210) that host the plurality of backend software services 215 and one or more computing devices (e.g., user devices, vehicle devices, vehicle provider devices, etc.) associated with the service entity, the plurality of vehicle providers, etc. For instance, the communication gateway can be located at the edge of the operations computing system (and/or the one or more servers hosting the plurality of backend software services 215) such that the plurality of requests pass through the communication gateway before reaching a respective backend software service.

Figure 3:
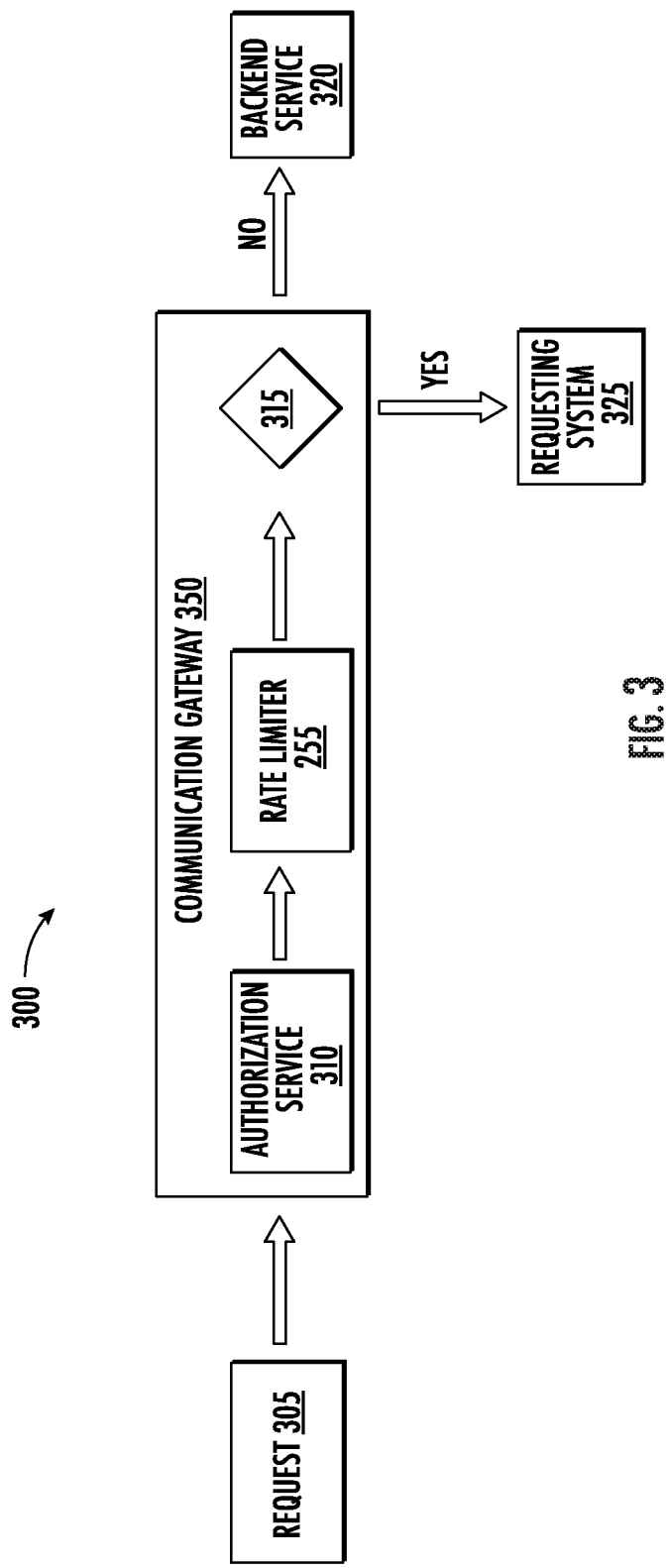
FIG. 3 depicts an example communication infrastructure according to example embodiments of the present disclosure.

For example, FIG. 3 depicts an example communication infrastructure 300 according to example embodiments of the present disclosure. The communication infrastructure 300 can include a communication gateway 350 (e.g., API Gateways 225) configured to receive a request 305, from a requesting system 325, for access to a requested backend service 320. The communication gateway 350 can authenticate the request 305, via an authentication service 310, and determine an action 315, via the rate limiter 255, to forward data to either the requested backend service 320 or the requesting system 325.

More particularly, the communication gateway 350 can include an authentication service 310 and/or a rate limiting service (e.g., rate limiter 255). The authentication service 310 can be configured to authenticate the request 305 based on one or more aspects of the request 305 (e.g., sender, cryptographic keys, etc.). For instance, the authentication service 310 can receive the request 305 and identify a client certificate associated with the request 305 (e.g., the client certificate can be included in the header of the request 305, etc.). The authentication service 310 can parse the client certificate to determine a vehicle provider associated with the request 305. By way of example, the client certificate can include a service provider identifier corresponding to at least one vehicle provider associated with the operations computing system (e.g., a vehicle provider of the service entity). The service provider identifier can include, for example, a cryptographic key (e.g., symmetric key, asymmetric key, etc.) issued to a respective vehicle provider by a licensing service of the service entity. The authentication service 310 can identify the service provider associated with the request 305 based on the service provider identifier. The authentication service 310 can authenticate the request 305 based, at least in part, on the client certificate and provide the request 305 and an identifier for the vehicle provider to the rate limiting service 255.

In some implementations, the request 305 can include a request from a service provider computing system requesting access to the one or more backend services to determine the availability of, to match, and/or to schedule a transportation service with an autonomous vehicle. In such a case, a vehicle provider can be determined based, at least in part, the request 305. For instance, the request can include a request for a respective vehicle provider to complete the user service request. By way of example, the request can include one or more request attributes. The one or more request attributes can be indicative of a sender of the request (e.g., the service provider identifier), a requested vehicle provider for providing the one or more transportation services, selected service parameters by the user (e.g., vehicle make, model, size, special accommodations (e.g., wheel chair accessible, child seat inclusion, etc.), and/or other service parameters. In some implementations, to match and/or schedule an autonomous vehicle, a communication can be sent to the vehicle provider (e.g., a computing system associated therewith) to determine if the vehicle provider would like to and/or will provide transportation service. The matching/scheduling of an autonomous vehicle from that vehicle provider can be made in response to a confirmation that the vehicle provider is willing to/will undertake the requested transportation service.

The rate limiting service 255 can receive the request 305 and the information (e.g., the one or more request attributes, service provider identifier, request vehicle provider, etc.) indicative of the vehicle provider associated with the request 305 and determine a routing action 315 for the request 305. By way of example, the rate limiting service 255 can maintain a request history associated with each vehicle provider and/or software service. The request history can identify a number of requests received from each respective service provider over a period of time (e.g., number of requests received in the last second, 10 seconds, 10 minutes, etc.). The rate limiting service 255 can maintain a separate request history for each service provider of the plurality of service providers. In addition, or alternatively, the rate limiting service 255 can maintain a separate request history for each software service provided by the operations computing system (e.g., backend system 210). By way of example, the rate limiting service 255 can use a custom key associated with the vehicle provider and/or the software service to assign the request 305 to a bucket. Each bucket can include a request history and a corresponding rate limit. The rate limiting service 255 can maintain a request count for each bucket and compare the request count over a period of time (e.g., as augmented by the request) with a respective rate limit to determine a routing action 215 for the request 205. In some implementations, the rate limit can be based at least in part on a number of available vehicles of the determined vehicle provider (to avoid overloading that vehicle provider).

Figure 4:
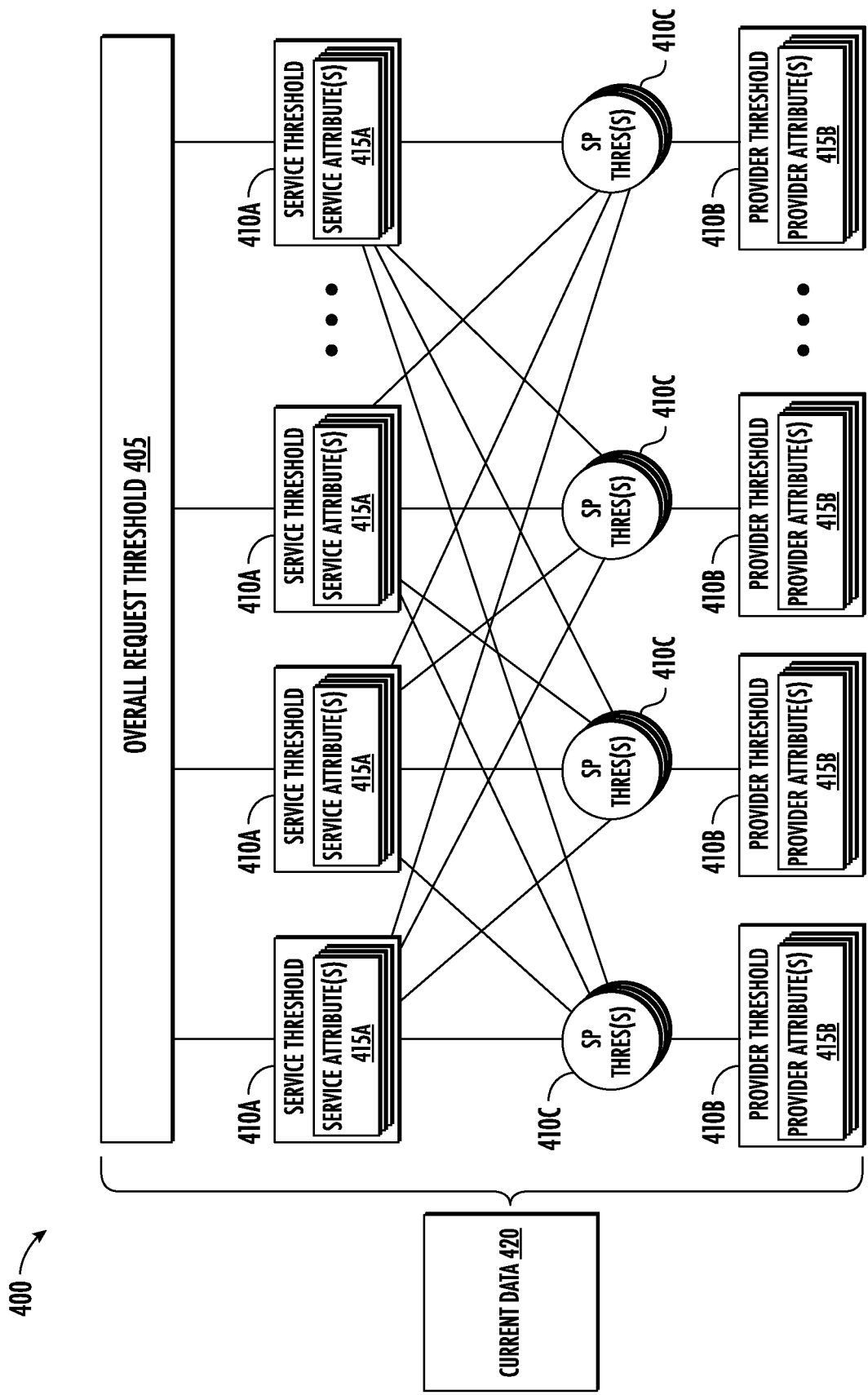
FIG. 4 depicts an example types rate limiter buckets according to example embodiments of the present disclosure.

FIG. 4, for example, depicts example types of rate limiter buckets 400 associated with the rate limiter according to example embodiments of the present disclosure. In this respect, the operations computing system (e.g., the rate limiting service 255) can determine a rate limit (e.g., the assigned bucket) for the request for access to a software service based, at least in part, on the vehicle provider associated with the request, the backend software service, and/or any other information associated with the performance and/or the demands of the system. By way of example, the rate limit associated with the request can include one of a plurality of rate limits. The plurality of rate limits can include one or more backend software service, vehicle provider, vehicle fleet (e.g., of a service provider, etc.), and/or vehicle specific rate limits.

In some implementations, rate limits can include a portion of a universal rate limit 405. For example, the universal rate limit 405 can include a global rate limitation defining a maximum number of acceptable requests by the one or more servers hosting a plurality of software services. The global rate limitation can be divided between each of the plurality of rate limits 410. In some implementations, the operations computing system can prioritize network traffic based on the overall resource consumption of the system by allocating a larger rate limit (e.g., a larger bucket) to one or more software services, vehicle providers, vehicle fleets, etc.

As an example, each of the plurality of software services offered by the service entity can be associated with one or more rate limits 410A (e.g., buckets) of a plurality of previously determined and continuously updated rate limits. For example, a respective software service can be associated with a different rate limit (e.g., bucket) for each of the plurality of vehicle providers, for each of a plurality of different time intervals (e.g., accept a higher threshold of requests during rush hour, etc.), for each of a plurality of different weather attributes, etc. As another example, each of the plurality of vehicle providers can be associated with one or more of a plurality of previously determined and continuously updated rate limits 420B (e.g., buckets). For example, a vehicle provider can be associated with a different rate limit for each of the plurality of different backend software services, for each of a plurality of different time intervals (e.g., accept a higher threshold of requests during rush hour, etc.), for each of a plurality of different weather attributes, etc.

Each of the plurality of rate limits 410 can be previously determined based, at least in part, on one or more environmental attributes, one or more service attributes 415A, one or more fleet attributes, one or more provider attributes 415B, and/or one or more service-provider attributes. The environmental attribute(s) can include weather conditions, timing data, location data, etc. For example, rate limits 410 can be determined such that a threshold number of acceptable requests over time can be lower and/or higher for a request received during one or more weather conditions (e.g., rain, ice, etc.), at one or more times (e.g., during rush hours, etc.), and/or from one or more locations (e.g., highly trafficked areas, etc.) that can affect the performance of one or more of the software services and/or indicate of a larger number of expected requests.

The service attribute(s) 415A can include at least one of a software version (e.g., indicative of the latest update to a respective software service) of the at least one respective software service, a service usage pattern indicative of a pattern of requests (e.g., a historical number of requests over time and/or during one or more periods of time, etc.) for access to the at least one respective service, and/or a safety threshold of the at least one respective software service. The safety threshold can be indicative of the impact of a respective software service to the safety of the vehicle and/or one or more passengers of the vehicle.

As an example, a remote operator service and/or an emergency stop service can function to increase passenger safety, whereas a routing service can have a limited impact on the safety of passengers. In such a case, the remote operator service and/or emergency stop service can be associated with a higher safety threshold than the routing service. In some implementations, the operations computing system can determine rate limits 410 with a higher threshold number of acceptable requests over time (e.g., larger buckets, etc.) for software service(s) associated with higher safety thresholds than for software service(s) associated with lower safety thresholds. This can lower the number of acceptable requests (e.g., the portion of the overall rate limit 405) for other backend services offered by the service entity to increase the overall safety of the service entity platform.

In some implementations, a priority level can be determined for each of the plurality of software services. The priority level can be used to prioritize a software service and/or the task performed by the software service. By way of example, the priority level for each software service can include the safety threshold. In addition, or alternatively, the priority level can be determined based on the usage rate of a software service relative to another software service (e.g., a higher priority can be assigned to a highly used software service as opposed to an under used software service, etc.). In some implementations, the rate limits 410A for each of the plurality of software services can be determined based on the priority level of each of the plurality of software services relative to one another. For example, the overall rate limit 405 can be apportioned to each of the software services based, at least in part, on the priority levels associated with each of the software services.

The provider attribute(s) 415B can be indicative of a provider usage pattern illustrating a pattern of requests for access to the plurality of services or an integrity threshold associated with a respective vehicle provider. The integrity threshold can be associated with the trustworthiness of the provider. By way of example, the integrity threshold of a respective vehicle provider can be based, at least in part, on a service provider history (e.g., how long the service provider has been associated with the service entity, etc.) associated with the vehicle provider. By way of example, vehicle providers that have been associated with the service entity (e.g., performing vehicle services for the service entity) for a longer period of time can be associated with a higher integrity threshold relative to newer vehicle providers. In some implementations, rate limit(s) 410 can be determined such that vehicle providers associated with a higher integrity threshold are assigned a rate limit (e.g., bucket) with a higher threshold of acceptable requests over time relative to vehicle providers associated with a lower integrity threshold.

Figure 5:
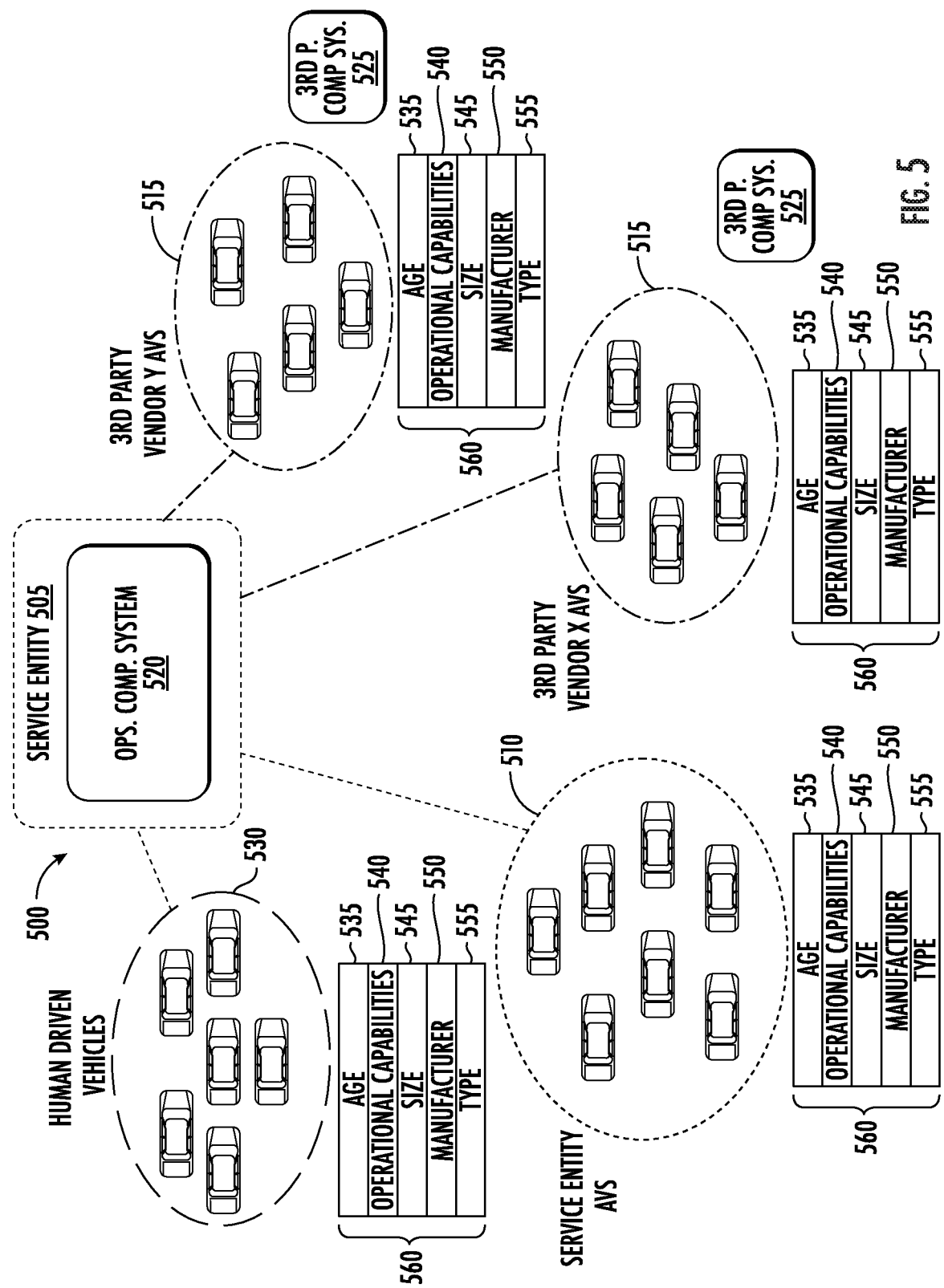
FIG. 5 depicts example types of vehicle providers according to example embodiments of the present disclosure.

In addition, or alternatively, the provider attributes 415B can include one or more fleet attributes. For example, FIG. 5 depicts an example ecosystem 500 of vehicles according to example embodiments of the present disclosure. The ecosystem 500 can include vehicles associated with one or more vehicle providers including, for example, a service entity 505, third party vehicle providers, an individual (e.g., owning/leasing a human driven vehicle), etc. The service entity 505 can utilize a plurality of autonomous vehicles including, but not limited to, service entity/first party autonomous vehicles 510 and/or third party autonomous vehicles 515 (e.g., third party vehicle provider X autonomous vehicles, third party vehicle provider Y autonomous vehicles, etc.) to provide vehicle services. In addition, or alternatively, the service entity 505 can utilize human driven vehicles 530 for providing vehicle services for the service entity 505.

An vehicles 510, 515, 230 can be included in one or more fleets. A fleet can include one or a plurality of autonomous vehicles. As discussed herein, the service entity 505 can be associated with a first computing system such as, for example, an operations computing system 520 (e.g., implementing the service infrastructure, service platform, etc.). The operations computing system 520 of the service entity 505 can help coordinate, support, manage, facilitate, etc. the provision of vehicle service(s) by the vehicles 510, 515, 530. The service entity 505, vehicles 510, 515, 530 and operations computing system 520 can include/represent the service entities, autonomous vehicles, and operations computing systems discussed with reference to one or more other figures described herein.

The service entity 505 can have a dedicated supply of vehicles. The dedicated supply can include vehicles that are owned, leased, or otherwise exclusively available to the service entity 505 (e.g., for the provision of its vehicle service(s), other tasks, etc.) for at least some period of time. This can include, for example, the first party autonomous vehicles 510. Additionally, or alternatively, this can include third party autonomous vehicles 515 that are associated with a third party vehicle provider, but that is online only with the service entity 505 (e.g., available to accept vehicle service assignments for only that service entity, etc.) for a certain time period (e.g., a few hours, a day, week, etc.).

In some implementations, a vehicle can be included in the service entity's non-dedicated supply of vehicles. This can include vehicles that are not exclusively available to the service entity 505. For example, third party autonomous vehicles 515 that are currently online with two different service entities (e.g., concurrently online with a first service entity and a second service entity, etc.) so that the autonomous vehicle 515 may accept vehicle service assignment(s) from either service entity, may be considered to be part of a non-dedicated supply of vehicles. In some implementations, whether a vehicle is considered to be part of the dedicated supply or the non-dedicated supply can be based, for example, on an agreement between the service entity and a third party vehicle provider associated with that vehicle.

Each of vehicles 510, 515, 530 and/or vehicle providers associated with the vehicles can associated with one or more fleet attributes 560. The fleet attributes can include 560 one or more common vehicle attributes across a plurality of vehicle. For instance, the fleet attribute(s) 560 can include information associated with one or more vehicles provided by a respective vehicle provider. The fleet attributes 560, for example, can be indicative of an age 535 (e.g., average age, median age, etc.) of the vehicles included in the fleet, the operational capabilities 540 (e.g., autonomous vehicle capabilities, geographic capabilities, etc.), and/or a size 545 of a fleet of vehicles associated with the respective vehicle provider. As another example, each vehicle 510, 515, 530 of the plurality of vehicles used by the service entity 505 to perform one or more vehicle services can be associated with a particular fleet of vehicles based on one or more shared attributes 560 such as a manufacturer 550 of the vehicle (e.g., make, model, etc.), a type 555 of the vehicle (non-autonomous, autonomous, etc.), the vehicle provider, and/or other factors sufficient to separate a plurality of vehicles.

In some implementations, each fleet of vehicles can be associated with one or more operational capabilities 540. For example, each of the one or more fleets of vehicles can be associated with a set of operational capabilities 540. In some implementations, the operational capabilities 540 of each vehicle in a respective fleet of vehicles can correspond to the set of operational capabilities 540 associated with the respective fleet of vehicles. The operational capabilities 540 of a vehicle and/or a fleet can indicate the capabilities (e.g., autonomy capabilities, etc.) the vehicle/fleet is able to perform, the capabilities the vehicle/fleet are unable to perform, areas in which the vehicle/fleet are able and/or permitted to operate, areas in which the vehicle/fleet are unable and/or restricted from operating, etc.

For example, the operational capabilities 540 can describe the autonomy capabilities of the autonomous vehicle (and/or its associated fleet), geographic data associated with a vehicle (and/or its associated fleet), and/or other information. The autonomy capabilities can be indicative of the capabilities of the autonomous vehicle to autonomously navigate/operate (e.g., while in a fully autonomous mode), the restrictions of an autonomous vehicle, scenarios in which the autonomous vehicle can/cannot operate, and/or other information descriptive of how an autonomous vehicle can or cannot autonomously operate. For instance, the autonomy capabilities can indicate one or more vehicle motion maneuvers that the autonomous vehicle can or cannot autonomously perform (e.g., without human input, while in a fully autonomous mode).

By way of example, the autonomy capabilities can indicate whether the autonomous vehicle(s) in a particular fleet can perform a U-turn and/or whether the autonomous vehicle(s) are restricted from performing an unprotected left turn. In another example, the autonomy capabilities can indicate that an autonomous vehicle is capable of operating in a respective traffic area (e.g., a high traffic area such as an urban setting, a minimal traffic area such as a rural setting, etc.) and/or one or a plurality of geographic fences/boundaries identifying where the autonomous vehicle can travel (e.g., based on the map data available to the autonomous vehicle, vehicle provider preferences, etc.). The geographic data can be indicative of the past, present, and/or future location(s) of an autonomous vehicle (e.g., when it is available to provide a vehicle service, for re-positioning, etc.).

Turning back to FIG. 4, the operations computing system can determine rate limit(s) 410B for a vehicle provider based on the one or more fleet attributes associated with one or more fleets of the vehicle provider. By way of example, the operations computing system can determine one or more rate limit(s) 410B with a higher threshold of acceptable requests for a service provider associated with a larger fleet of vehicles relative to service providers associated with a smaller fleet of vehicles. As another example, the operations computing system can determine one or more rate limit(s) 410B with a higher/lower threshold of acceptable requests over time for a service provider associated with more vehicles requiring more manual intervention (e.g., human-driven vehicles, outdated vehicles, etc.) relative to service providers associated with more autonomy-capable vehicles (e.g., fully autonomous vehicles, newer vehicle models, etc.) as indicated by the operational capabilities of the vehicles.

The service-provider attributes 410C can include and/or be indicative of one or more usage patterns indicative of one or more previous requests for access to a respective software service from a respective vehicle provider during one or more periods of time. For instance, each of the one or more service attributes 415A, one or more provider attributes 415B, and/or one or more service-provider attributes can include one or more usage patterns indicative of one or more previous requests for access to one or more of the plurality of software services. The one or more usage patterns can be indicative of a number of previous requests for access to one or more of the plurality of software services during one or more periods of time. For example, the service attributes 415A can include one or more usage patterns indicative of a previous number of requests received for access to a respective software service over one or more periods of time. The provider attributes 415B can include one or more usage patterns indicative of a previous number of requests received for access to the plurality of software services from a respective vehicle provider. And, the service-provider attributes can include one or more usage patterns indicative of a previous number of requests received for access to a respective software service from a respective vehicle provider.

In some implementations, the service-provider attributes can be indicative of an expected number of requests from a fleet of vehicles to one or more respective software services based on the operational capabilities of the vehicles in the fleet(s) of a respective vehicle provider and/or the type of services offered by the one or more respective software service(s). By way of example, an earlier version of an autonomous vehicle may make more calls to a remote operator service than advanced versions. In such a case, a threshold number of acceptable requests 410C can be set for requests between a vehicle provider and a respective software service based on the expected number of requests.

In some implementations, the rate limits 410 can be determined/adjusted/modified based on current data 420. The current data 420 can include a current time (e.g., daily time, date, etc.), a geographic location associated with the request (e.g., a location of the vehicle for which the request is generated, etc.), current environmental conditions (e.g., weather conditions at the geographic location, etc.), and/or any other current information associated with a vehicle service. By way of example, the current data 420 can be indicative of the time during which the request is received (e.g., a time stamp, etc.), one or more current environmental conditions (e.g., rain, sleet, snow, etc.), and/or a geographic location where the request originated.

Turning back to FIG. 3, the rate limit(s) can be utilized by the rate limiter 255 to determine a routing action 315 for a request 305. The routing action 315 can include forwarding the request 305 to the requesting backend service 320 and/or returning a message to the requesting system 325.

Figure 6:
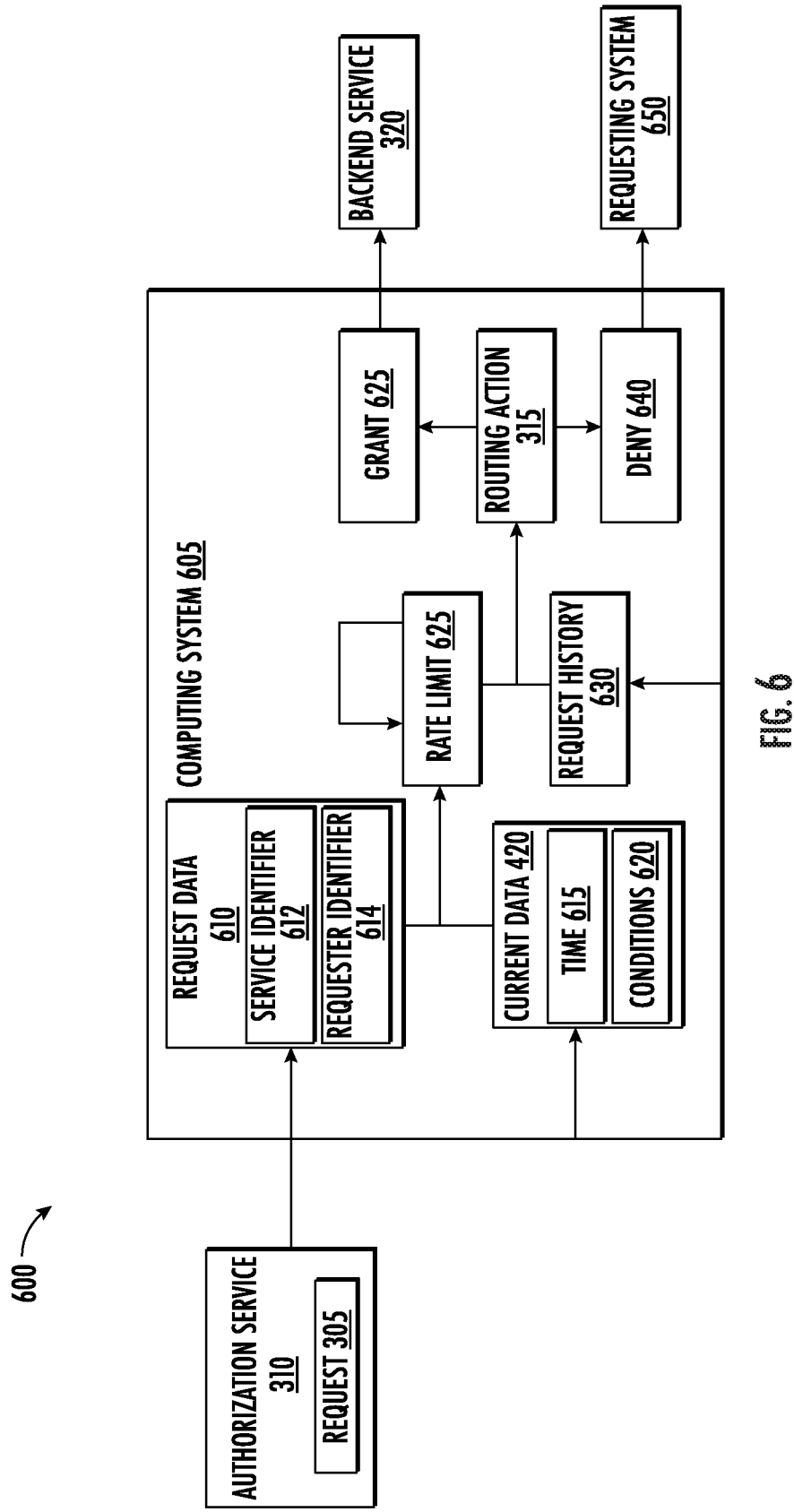
FIG. 6 depicts an example dataflow diagram for determining a routing action for a request according to example embodiments of the present disclosure.

More particularly, FIG. 6 depicts an example dataflow diagram 600 for determining a routing action for a request according to example embodiments of the present disclosure. FIG. 6 depicts a computing system 605 (e.g., operations computing system 605) configured to obtain a request for access to a software service 320 for facilitating one or more transportation services. For instance, the operations computing system 605 can provide a plurality of software services for facilitating one or more transportation services. The plurality of different software services can include one or more of a trip assignment service, a routing service, a supply positioning service, a payment service, a remote operator service and/or any other software service described herein or otherwise associated with facilitating one or more transportation services via one or more vehicles (e.g., manual, autonomous, etc.). The requested software service 320 can include one of the plurality of software services provided by the operations computing system 605. The operations computing system 605 can obtain the request 305 from a requesting system 325 (e.g., a vehicle provider and/or one or more intermediate services associated with the vehicle provider).

The operations computing system 605 (e.g., the authorization service 310) can determine a vehicle provider associated with the request 305. For example, as described above, the authentication service 310 can receive the request 305 and identify the vehicle provider based on one or more request identifiers 612, 614. For example, the request 305 can include request data 610. The request data 610 can include a service identifier 612 indicative of a requested backend service 320 and/or a requester identifier 614. The identifier(s) 612, 614 can include, for example, a client certificate with one or more custom keys (e.g., a vehicle provider identifier, etc.). In addition, or alternatively, the identifier(s) 612, 614 can include an internet protocol address. For instance, a vehicle provider associated with the request 305 can be determined based on the internet protocol address associated with the request 305. The operations computing system 605 can determine the requesting system 650 (e.g., a requesting transportations service provider) associated with the request 305 based, at least in part, on the identifier(s) 612, 614. For example, a respective vehicle provider can be associated with one or more corresponding identifier(s) and/or internet protocols.

The operations computing system can obtain current data 420. The current data 420 can include timing data 615 indicative of a time associated with the request 305. In addition, or alternatively, the current data 420 can include environmental condition data 620. The environmental condition data 620 can identify one or more conditions associated a request 305. For instance, the conditions can include expected and/or current weather, traffic conditions, etc. at a geographic area associated with the request 305 at the current time as indicated by the timing data 615.

The operations computing system 605 can determine a rate limit 625 corresponding to the request 305. The rate limit 625 can define a threshold number of requests over a period of time. For example, the threshold number of requests can be indicative of a maximum number of acceptable requests over a period of time for requests similar to the received request 305. The maximum number of acceptable requests can include, for example, a range of requests (e.g., 10, 100, 1000, etc.) per second, minutes, and/or any other unit of time. In addition, or alternatively, the rate limit 625 can define a maximum queue length. The maximum queue length can define a maximum number of pending requests that can be queued for a software service. By way of example, the rate limit 625 can define a maximum queue length of 100. In such a case, the operations computing system 605 can queue a request to be serviced by the software service until the queue reaches 100 pending requests at which point the operations computing system 605 can discard a request corresponding to the rate limit 625.

By way of example, the rate limit 625 can include an in-memory leaky bucket approach. For each bucket, the operations computing system 605 can meter the request rate by determining the next minimum allowable time a request can be processed. A request count can be maintained for each rate limit 625 (e.g., bucket) and a queue can be used to store pending requests that cannot be immediately processed. For instance, a rate limit 625 can include a maximum number of acceptable requests per second and a maximum number of acceptable pending requests that can be queued in excess of the rate limit 625. The rate limit 625 can be stored within a data structure of memory of the computing system 605. Retrieval of the rate limit 625 can include accessing such a data structure. Modification of a rate limit can include adjusting a value, etc. stored in a field or other entry medium within the data structure (e.g., based known fleet attributes, fleet attributes learned over time, etc.).

The operations computing system 605 can determine the rate limit 625 corresponding to the request 305 based on one or more attributes of the request 305. As examples, the rate limit 625 can be determined based on the vehicle provider, the software service, current data 420, one or more environmental factors, etc. By way of example, the rate limit 625 can be selected from a plurality of previously determined bucketized rate limits. The operations computing system 605 can match the request 305 to a rate limit bucket that is most similar to the request 305. For instance, the plurality of rate limits can include a rate limit bucket for requests associated with the vehicle provider, the requested software service, environmental attributes matching the current environmental conditions, and/or any combination therebetween. The operations computing system 605 can select the rate limit 625 by comparing the request 305 to each rate limit bucket.

In some implementations, the operations computing system 605 can modify the rate limit 625 based on the one or more current environmental conditions. For example, the operations computing system 605 can increase a threshold number of requests over time based on one or more current or expected surges in requests. An expected surge in requests can be predicted, for example, based on one or more emergency situations (e.g., evacuations due to hurricanes, earthquakes, tornadoes, etc.). In addition, the threshold number of requests over time can be decreased based on one or more current or expected harmful conditions such as, for example, rain, sleet, snow, etc. that may cause lower bandwidth availability and/or otherwise degrade the performance of the software services offered by the service entity. In addition, or alternatively, a rate limit 625 can be modified based on one of more other factors such as, for example, an expected maintenance event (e.g., server maintenance), current or expected traffic events (e.g., expected surge in requests due scheduled entertainment events, etc.), and/or any other factor that can affect the frequency of requests to the backend software services of the service entity platform.

The operations computing system 605 can determine a routing action 315 for the request 305 based at least in part on the rate limit 625. For example, the operations computing system 605 can determine a routing action 325 for the request 305 based on a request history 630 associated with the software service 320 and/or the rate limit 625. The routing action 315 can include a granting action 625 associated with permitting access to the software service 320, a denial action 640 associated with denying access to the software service 320, and/or a queueing action associated with storing the request 305 for later processing. The granting action 625, for example, can include forwarding the request 305 to the software service 320 and/or any middleware associated with the software service 320. The denial action 640, for example, can include rejecting the request 305. And, the queueing action can include adding the request to a queue of pending requests.

In some implementations, the denial action 640 can include generating an error message indicative of the rejection. The error message, for example, can indicate that the rate limit 625 has been exceeded. The operations computing system 605 can provide the error message to the system 650 (e.g., vehicle provider) requesting access to the backend system. In addition, or alternatively, the error message can be logged in memory. The logged error message can include data indicative of the request 305 such as, for example, the current data 420, the requested software service 320, the requesting system 650 (e.g., the vehicle provider), etc.

As discussed herein, the request history 630 can be indicative of a number of previously received requests. For example, the operations computing system 605 can include a request counter that counts the requests received in a preceding period of time (e.g., requests received within a second, ten seconds, a minute, etc. of the current request 305, etc.). For instance, the request history 630 can be a log of received requests over a period of time. The period of time can be any unit of time such as, for example, the preceding second, minute, etc. In some implementations, the request history 630 can include a log of received requests over a period of time matching the period of time defined by one or more of the plurality of rate limits. For example, as described above, the operations computing system 605 can maintain a request history for each of a plurality of bucketized rate limits. The request history can include a number of previously received requests that have been assigned to the respective bucket associated with the selected rate limit 625.

The operations computing system 605 can determine whether the request 305 and the number of previously received requests (e.g., as indicated by the request history 630) achieve the rate limit 625. For instance, the operations computing system 605 can determine that the request 305 and the number of previously received requests (e.g., as indicated by the request history 630) does not achieve (e.g., is lower than or equal to) the threshold number of acceptable request as defined by the rate limit 625. In response to determining that the number of previously received requests does not achieve the rate limit 625, the operations computing system 605 can determine a granting action 625 as the routing action 315 for the request 305. In addition, or alternatively, the operations computing system 605 can determine that the request 305 and the number of previously received requests (e.g., as indicated by the request history 630) achieves (e.g., exceeds or is equal to) the threshold number of requests as defined by the rate limit 625. In response to determining that the request 305 and the number of previously received requests achieve the rate limit 625, the operations computing system 605 can determine a denial action 640 as the routing action 315 for the request 305.

The operations computing system 605 can initiate the routing action 315. By way of example, the operations computing system 605 can initiate the provisioning of the request 305 to the backend software service 320 in the event that a granting action 625 is determined for the request 305. In addition, or alternatively, for example, in the event that a denial action 640 is determined for the request 305, the operations computing system 605 can deny the request 305 by discarding the request 305. In some implementations, the operations computing system 605 can initiate the generation of an error message and the provisioning of the error message to the requesting system 650 (e.g., the vehicle provider). The request 305 and/or data associated with the request 305 (e.g., logged error message) can be logged in memory at the operations computing system 605.

In some implementations, the operations computing system 605 can update the rate limit 625 based, at least in part, on the request 305 and/or the current data 420. For example, the operations computing system 605 can be configured to update the rate limit 625 (and/or any of the predetermined bucketized rate limits) at a dynamic and/or static frequency. For instance, the operations computing system 605 can dynamically update the rate limit 625 based on a number of times the threshold number of requests over the period of time is achieved. By way of example, the operations computing system 605 can adjust a rate limit 625 in the event that the threshold number of requests is exceeded on a regular basis (e.g., multiple times a minute, hour, day, week, etc.). In addition, or alternatively, the update frequency can be statically set. For example, the operations computing system 605 can be configured to update the plurality of rate limits at a defined frequency such as, for example, once a day, week, month, etc. For instance, the operations computing system 605 can access logged data (e.g., a plurality of logged error messages, etc.) at the defined frequency, determine one or more trends (e.g., one or more similar reoccurring errors (e.g., by the same vehicle provider, for the same or similar backend software service, within the same time range, during matching environmental conditions or attributes, etc.)), and adjust the one or more rate limits based, at least in part, on the one or more trends.

As one example, the operations computing system 605 can determine an initial set of rate limits. The initial set of rate limits can include a rate limit bucket for each of the plurality of vehicle providers associated with the service entity. In some implementations, the initial set of rate limits can be determined for each respective vehicle provider of the plurality of vehicle providers based, at least in part, on the size of a fleet of vehicles associated with the respective vehicle provider. The operations computing system 605 can automatically update (e.g., on a dynamic frequency, on a static frequency, etc.) the rate limit bucket (e.g., increase/lower the size, etc.) for each of the vehicle providers based, at least in part, on a usage pattern of each of the vehicle providers. For example, the operations computing system 605 can access a data structure (e.g., list, table, etc.) storing the rate limit 625 and adjust the value(s) representing the rate limit 625 within the data structure.

Figure 7:
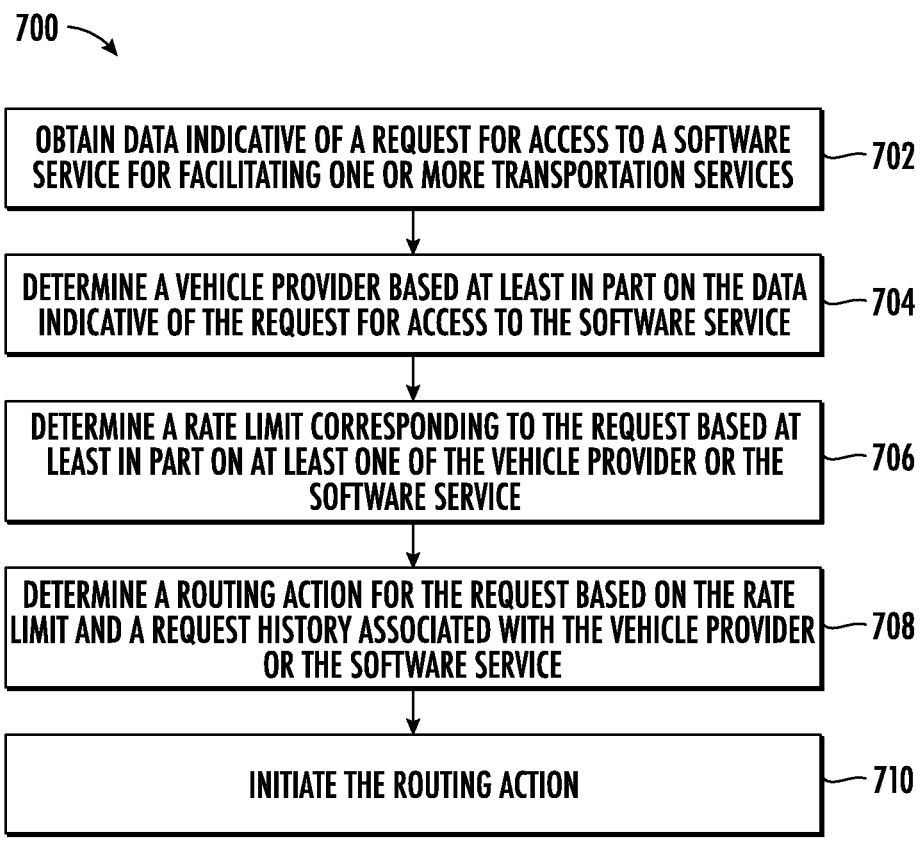
FIG. 7 depicts a flow diagram of an example method for filtering requests according to example embodiments of the present disclosure.

Turning to FIG. 7, FIG. 7 depicts a flowchart of a method for limiting requests to backend services according to aspects of the present disclosure. One or more portion(s) of the method 700 can be implemented by a computing system that includes one or more computing devices such as, for example, the computing systems described with reference to the other figures (e.g., operations computing system 104, the backend system 210, etc.). Each respective portion of the method 700 can be performed by any (or any combination) of one or more computing devices. Moreover, one or more portion(s) of the method 700 can be implemented as an algorithm on the hardware components of the device(s) described herein (e.g., as in FIGS. 1, 2, 5, 9, etc.), for example, to limit requests to a backend system. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 7 is described with reference to elements/terms described with respect to other systems and figures for exemplary illustrated purposes and is not meant to be limiting. One or more portions of method 700 can be performed additionally, or alternatively, by other systems.

At 705, the method 700 can include obtaining data indicative of a request for access to a software service for facilitating one or more transportation services. For example, a computing system (e.g., operations computing system 102, backend system 210, etc.) can obtain data indicative of a request for access to a software service for facilitating one or more transportation services.

At 710, the method 700 can include determining a vehicle provider based at least in part on the data indicative of the request for access to the software service. For example, the computing system (e.g., operations computing system 102, backend system 210, etc.) can determine a vehicle provider based at least in part on the data indicative of the request for access to the software service.

At 715, the method 700 can include determining a rate limit corresponding to the request based at least in part on at least one of the vehicle provider or the software service. For example, the computing system (e.g., operations computing system 102, backend system 210, etc.) can determine a rate limit corresponding to the request based at least in part on at least one of the vehicle provider or the software service.

At 720, the method 700 can include determining a routing action for the request based on the rate limit and a request history associated with the vehicle provider or the software service. For example, the computing system (e.g., operations computing system 102, backend system 210, etc.) can determine a routing action for the request based on the rate limit and a request history associated with the vehicle provider or the software service.

At 725, the method 700 can include initiating the routing action. For example, the computing system (e.g., operations computing system 102, backend system 210, etc.) can initiate the routing action.

Figure 8:
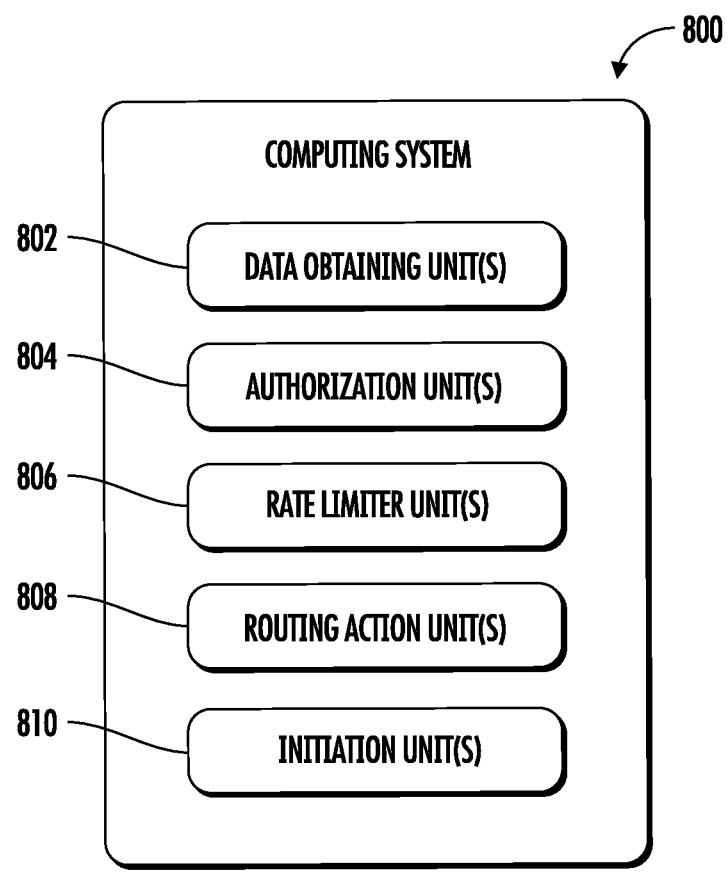
FIG. 8 depicts example units associated with a computing system for performing operations and functions according to example embodiments of the present disclosure.

Various means can be configured to perform the methods and processes described herein. For example, FIG. 8 depicts example units associated with a computing system for performing operations and functions according to example embodiments of the present disclosure. As depicted, FIG. 8 depicts a computing system 800 that can include, but is not limited to, data obtaining unit(s) 802; authorization unit(s) 804; rate limiter unit(s) 806; routing action unit(s) 808; and initiation unit(s) 810. In some implementations one or more units may be implemented separately. In some implementations, one or more units may be included in one or more other units.

In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein (including the claims). For instance, the means (e.g., data obtaining unit(s) 802, etc.) can be configured to obtain a request for access to a software service for facilitating one or more transportation services. The means (e.g., authorization unit(s) 804, etc.) can be configured to determine a vehicle provider associated with the request. The means (e.g., rate limiter unit(s) 806, etc.) can be configured to determine a rate limit corresponding to the request based, at least in part, on the vehicle provider or the software service. The rate limit can define a threshold number of requests over a period of time. The means (e.g., routing action unit(s) 808, etc.) can be configured to determine a routing action for the request based, at least in part, on a request history associated with the vehicle provider and the rate limit corresponding to the request. In addition, the means (e.g., initiation unit(s) 810, etc.) can be configured to initiate the routing action.

FIG. 10 depicts example system components of an example system 900 according to example embodiments of the present disclosure. The example system 900 can include the computing system 905 (e.g., vehicle computing system 112, one or more vehicle devices, etc.) and the computing system 950 (e.g., operations computing system 104, remote computing devices 106, backend system 210, etc.), etc. that are communicatively coupled over one or more network(s) 945.

The computing system 905 can include one or more computing device(s) 910. The computing device(s) 910 of the computing system 905 can include processor(s) 915 and a memory 920. The one or more processors 915 can be any suitable processing device (e.g., a processor core, a microprocessor, an ASIC, a FPGA, a controller, a microcontroller, etc.) and can be one processor or a plurality of processors that are operatively connected. The memory 920 can include one or more non-transitory computer-readable storage media, such as RAM, ROM, EEPROM, EPROM, one or more memory devices, flash memory devices, etc., and combinations thereof.

The memory 920 can store information that can be accessed by the one or more processors 915. For instance, the memory 920 (e.g., one or more non-transitory computer-readable storage mediums, memory devices) can include computer-readable instructions 925 that can be executed by the one or more processors 915. The instructions 925 can be software written in any suitable programming language or can be implemented in hardware. Additionally, or alternatively, the instructions 925 can be executed in logically and/or virtually separate threads on processor(s) 915.

For example, the memory 920 can store instructions 925 that when executed by the one or more processors 915 cause the one or more processors 915 to perform operations such as any of the operations and functions of or for which the computing systems described herein are configured.

The memory 920 can store data 930 that can be obtained, received, accessed, written, manipulated, created, and/or stored. The data 930 can include, for instance, current data, service provider data, request data, etc. as described herein. In some implementations, the computing device(s) 910 can obtain from and/or store data in one or more memory device(s) that are remote from the computing system 905 such as one or more memory devices of the computing system 950.

The computing device(s) 910 can also include a communication interface 935 used to communicate with one or more other system(s) (e.g., computing system 950). The communication interface 935 can include any circuits, components, software, etc. for communicating via one or more networks (e.g., 945). In some implementations, the communication interface 935 can include for example, one or more of a communications controller, receiver, transceiver, transmitter, port, conductors, software and/or hardware for communicating data/information.

The computing system 950 can include one or more computing devices 955. The one or more computing devices 955 can include one or more processors 960 and a memory 965. The one or more processors 960 can be any suitable processing device (e.g., a processor core, a microprocessor, an ASIC, a FPGA, a controller, a microcontroller, etc.) and can be one processor or a plurality of processors that are operatively connected. The memory 965 can include one or more non-transitory computer-readable storage media, such as RAM, ROM, EEPROM, EPROM, one or more memory devices, flash memory devices, etc., and combinations thereof.

The memory 965 can store information that can be accessed by the one or more processors 960. For instance, the memory 965 (e.g., one or more non-transitory computer-readable storage mediums, memory devices) can store data 975 that can be obtained, received, accessed, written, manipulated, created, and/or stored. The data 975 can include, for instance, request data, service provider data, current data, rate limiter data, and/or other data or information described herein. In some implementations, the computing system 950 can obtain data from one or more memory device(s) that are remote from the computing system 950.

The memory 965 can also store computer-readable instructions 970 that can be executed by the one or more processors 960. The instructions 970 can be software written in any suitable programming language or can be implemented in hardware. Additionally, or alternatively, the instructions 970 can be executed in logically and/or virtually separate threads on processor(s) 960. For example, the memory 965 can store instructions 970 that when executed by the one or more processors 960 cause the one or more processors 960 to perform any of the operations and/or functions described herein, including, for example, any of the operations and functions of the devices described herein, and/or other operations and functions.

The computing device(s) 955 can also include a communication interface 980 used to communicate with one or more other system(s). The communication interface 980 can include any circuits, components, software, etc. for communicating via one or more networks (e.g., 945). In some implementations, the communication interface 980 can include for example, one or more of a communications controller, receiver, transceiver, transmitter, port, conductors, software and/or hardware for communicating data/information.

The network(s) 945 can be any type of network or combination of networks that allows for communication between devices. In some embodiments, the network(s) 945 can include one or more of a local area network, wide area network, the Internet, secure network, cellular network, mesh network, peer-to-peer communication link and/or some combination thereof and can include any number of wired or wireless links. Communication over the network(s) 945 can be accomplished, for instance, via a network interface using any type of protocol, protection scheme, encoding, format, packaging, etc.

Figure 9:
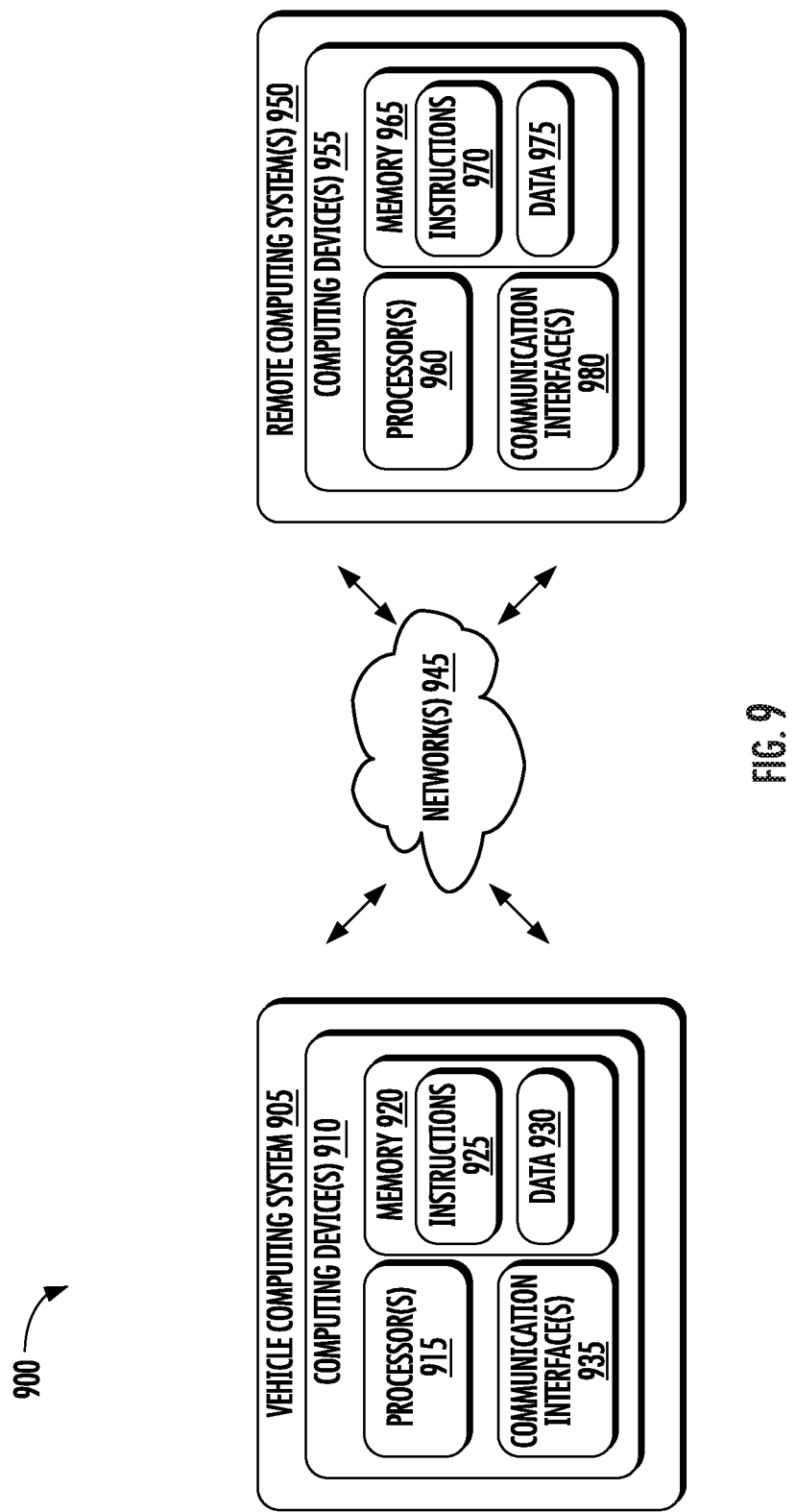
FIG. 9 depicts a block diagram of an example computing system according to example embodiments of the present disclosure.

FIG. 9 illustrates one example system 900 that can be used to implement the present disclosure. Other computing systems can be used as well. Computing tasks discussed herein as being performed at an operations computing system can instead be performed remote from the operations computing system, or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method, the method comprising:
    obtaining, by a computing system comprising one or more computing devices, data indicative of a request for access to a software service executing at the computing system, the software service being requestable by a plurality of vehicle providers to support transportation services to be provided by the plurality of vehicle providers;
    determining that the request is associated with a first vehicle provider of the plurality of the vehicle providers, the first vehicle provider being associated with a first fleet of autonomous vehicles for providing one or more transportation services;
    obtaining a first fleet attribute describing an operational capability of the first fleet of autonomous vehicles;
    determining, by the computing system, a rate limit corresponding to the request based, at least in part, on the first vehicle provider, the first fleet attribute, and the software service, the rate limit describing a threshold number of requests associated with the first vehicle provider that are permitted to the software service over a period of time;
    responding, by the computing system, to the request using the software service executing at the computing system, the responding being based, at least in part, on the rate limit corresponding to the request and a request history associated with the first vehicle provider or the software service; and
    after responding to the request, initiating, by the computing system, a transportation service to be executed by an autonomous vehicle of the first fleet of autonomous vehicles.

2. The computer-implemented method of claim 1, wherein the responding to the request comprises at least one of a granting action associated with permitting access to the software service, a denial action associated with denying access to the software service, or a queueing action.

3. The computer-implemented method of claim 2, wherein the request history is indicative of a number of previously received requests associated with the first vehicle provider, and wherein the responding to the request comprises:
    incrementing, by the computing system, the number of previously received requests with the request;
    determining, by the computing system, that the incremented number of previously received requests does not achieve the rate limit; and
    in response to determining that the incremented number of previously received requests does not achieve the rate limit, determining, by the computing system, the granting action for responding to the request.

4. The computer-implemented method of claim 2, wherein the request history is indicative of a number of previously received requests associated with the first vehicle provider, and wherein the responding to the request comprises:
incrementing, by the computing system, the number of previously received requests with the request;
determining, by the computing system, that the incremented number of previously received requests achieve the rate limit; and
in response to determining that the incremented number of previously received requests achieve the rate limit, determining, by the computing system, the denial action for responding to the request.

5. The computer-implemented method of claim 1, wherein the rate limit is one of a plurality of rate limits, each of the plurality of rate limits associated with at least one respective software service of a plurality of different software services for facilitating one or more transportation services, and wherein the rate limit corresponding to the request is previously determined based, at least in part, on the software service.

6. The computer-implemented method of claim 5, wherein the plurality of different software services comprise at least one of a matching service, trip assignment service, a routing service, a supply positioning service, a payment service, or a remote operator service.

7. The computer-implemented method of claim 1, wherein the request for access to the software service comprises a request for at least one of: an availability of one or more autonomous vehicles to perform the one or more transportation services, a match of one or more of the autonomous vehicles to perform the one or more transportation services, or scheduling one or more of the autonomous vehicles to perform the one or more transportation services.

8. The computer-implemented method of claim 6, wherein each of the plurality of rate limits are determined based, at least in part, on one or more service attributes associated with the at least one respective software service.

9. The computer-implemented method of claim 8, wherein the one or more service attributes comprise at least one of a version of the at least one respective software service, a service usage pattern indicative of a pattern of requests for access to the at least one respective software service, or a safety threshold of the at least one respective software service.

10. The computer-implemented method of claim 1, wherein the rate limit is one of a plurality of rate limits, each of the plurality of rate limits associated with at least one respective vehicle provider of a plurality of different vehicle providers for facilitating one or more transportation services, and wherein each of the plurality of rate limits are determined based, at least in part, on one or more attributes associated with the at least one respective service provider of the plurality of different vehicle providers.

11. The computer-implemented method of claim 10, wherein the one or more attributes associated with the at least one respective service provider comprise one or more fleet attributes indicative of an age, operational capabilities, or a size of a fleet of vehicles associated with the at least one respective service provider or provider attributes indicative of a provider request history or integrity threshold associated with the at least one respective service provider.

12. A computing system comprising:
one or more processors executing a plurality of software services for facilitating one or more transportation services, the plurality of software services requestable by a plurality of vehicle providers to support transportation services to be provided by the plurality of vehicle providers; and
one or more tangible, non-transitory, computer readable media that collectively store instructions that when executed by the one or more processors cause the computing system to perform operations, the operations comprising:
obtaining data indicative of a request from a first vehicle provider for access to a software service, the software service being one of the plurality of software services, the first vehicle provider being associated with a first fleet of autonomous vehicles for providing the one or more transportation services;
determining that the request is associated with a first vehicle provider of the plurality of vehicle providers, the first vehicle provider being associated with a first fleet of autonomous vehicles for providing one or more transportation services;
obtaining a first fleet attribute describing an operational capability of the first fleet of autonomous vehicles;
determining a rate limit corresponding to the request based, at least in part, on the first vehicle provider, the first fleet attribute, and the software service for routing autonomous vehicles, the rate limit describing a threshold number of requests from the first vehicle provider that are permitted to the software service for routing autonomous vehicles over a period of time;
responding to the request using the software service executing at the computing system, the responding being based, at least in part, on a request history associated with the software service for routing autonomous vehicles and the rate limit corresponding to the request; and
after responding to the request, initiating a transportation service to be executed by an autonomous vehicle of the first fleet of autonomous vehicles.

13. The computing system of claim 12, wherein each of the plurality of software services are associated with one or more rate limits of a plurality of rate limits.

14. The computing system of claim 13, wherein each of the plurality of rate limits are determined based, at least in part, on one or more environmental attributes, one or more service attributes, one or more fleet attributes, one or more provider attributes, or one or more service-provider attributes.

15. The computing system of claim 14, wherein each of the one or more service attributes, one or more provider attributes, and one or more service-provider attributes comprise one or more usage patterns indicative of one or more previous requests for access to one or more of the plurality of software services.

16. The computing system of claim 15, wherein the one or more usage patterns are indicative of a number of previous requests for access to one or more of the plurality of software services during one or more periods of time.

17. The computing system of claim 12, wherein determining the rate limit corresponding to the request comprises:
obtaining current data indicative of a time during which the request is received;
determining the rate limit corresponding to the request based, at least in part, on the time during which the request is received; and updating the rate limit based, at least in part, on the request and the current data.

18. The computing system of claim 17, wherein the current data is indicative of one or more current environmental conditions, and wherein the operations further comprise:

modifying the rate limit based, at least in part, on the one or more current environmental conditions.

19. One or more tangible, non-transitory computer-readable media storing computer-readable instructions that when executed by one or more processors cause the one or more processors to perform operations, the operations comprising:

obtaining data indicative of a request for access to a software service, the software service being requestable by a plurality of vehicle providers to support transportation services to be provided by the plurality of vehicle providers;

determining that the request is associated with a first vehicle provider of the plurality of vehicle providers, the first vehicle provider being associated with a first fleet of autonomous vehicles for providing one or more transportation services;

obtaining a first fleet attribute describing an operational capability of the first fleet of autonomous vehicles;

determining a rate limit corresponding to the request based, at least in part, on the first vehicle provider, the first fleet attribute, and the software service, the rate limit describing a threshold number of requests associated with the first vehicle provider that are permitted to the software service over a period of time;

responding to the request using the software service, the responding being based, at least in part, on a request history associated with the software service and the rate limit corresponding to the request; and after responding to the request, initiating a transportation service to be executed by an autonomous vehicle of the first fleet of autonomous vehicles.

20. The one or more tangible, non-transitory computer-readable media of claim 19, the first fleet of autonomous vehicles comprising a plurality of autonomous vehicles configured to perform the one or more transportation services, and wherein the first fleet attribute indicative of one or more usage patterns indicative of one or more previous requests for access to the software service from the plurality of autonomous vehicles of the vehicle provider.

* * * * *

UNITED STATES PATENT AND TRADEMARK OFFICE
CERTIFICATE OF CORRECTION

PATENT NO. : 11,599,839 B2
APPLICATION NO. : 17/014452
DATED : March 7, 2023
INVENTOR(S) : Chalam et al.

It is certified that error appears in the above-identified patent and that said Letters Patent is hereby corrected as shown below:

On the Title Page

In item (73), in "Assignee", in Column 1, Line 1, delete "Inc," and insert --Inc.,-- therefor Signed and Sealed this
Second Day of January, 2024

Katherine Kelly Vidal
*Director of the United States Patent and Trademark Office*